US012639816B2

(12) United States Patent
Bagherinia et al.

(10) Patent No.: US 12,639,816 B2
(45) Date of Patent: May 26, 2026

(54) SEMI-SUPERVISED FUNDUS IMAGE QUALITY ASSESSMENT METHOD USING IR TRACKING

(71) Applicants:Carl Zeiss Meditec, Inc., Dublin, CA (US); Carl Zeiss Meditec AG, Jena (DE)

(72) Inventors: Homayoun Bagherinia, Dublin, CA (US); Aditya Nair, Dublin, CA (US); Niranchana Manivannan, Dublin, CA (US); Mary Durbin, San Francisco, CA (US); Lars Omlor, Dublin, CA (US); Gary Lee, Dublin, CA (US)

(73) Assignees: Carl Zeiss Meditec, Inc., Dublin, CA (US); Carl Zeiss Meditec AG, Jena (DE)

( * ) Notice: Subject to any disclaimer, the term of this patent is extended or adjusted under 35 U.S.C. 154(b) by 130 days.

(21) Appl. No.: 18/277,900

(22) PCT Filed: Feb. 25, 2022

(86) PCT No.: PCT/EP2022/054828
§ 371 (c)(1),
(2) Date: Aug. 18, 2023

(87) PCT Pub. No.: WO2022/180227
PCT Pub. Date: Sep. 1, 2022

(65) Prior Publication Data
US 2024/0127446 A1 Apr. 18, 2024

Related U.S. Application Data

(60) Provisional application No. 63/154,504, filed on Feb. 26, 2021, provisional application No. 63/154,177, filed on Feb. 26, 2021.

(51) Int. Cl.
*G06T 7/00* (2017.01)
*G06T 7/246* (2017.01)
(Continued)

(52) U.S. Cl.
CPC ............ *G06T 7/0014* (2013.01); *G06T 7/248* (2017.01); *G06V 10/761* (2022.01);
(Continued)

(58) Field of Classification Search
CPC ................... G06T 7/0014; G06T 7/248; G06T 2207/10016; G06T 2207/10101;
(Continued)

(56) References Cited

U.S. PATENT DOCUMENTS

| | | | | |
|---|---|---|---|---|
| 8,811,657 B2 * | 8/2014 | Teiwes | .................. | G06T 7/0016 |
| | | | | 351/239 |
| 9,514,513 B2 * | 12/2016 | Kim | ........................ | G06T 3/147 |

(Continued)

FOREIGN PATENT DOCUMENTS

| | | |
|---|---|---|
| CN | 110826470 | 2/2020 |
| WO | 2022180227 | 9/2022 |

OTHER PUBLICATIONS

International Searching Authority, International Search Report and Written Opinion dated Jun. 24, 2022 in International Serial No. PCT/EP2022/054828.

(Continued)

*Primary Examiner* — Trang U Tran
(74) *Attorney, Agent, or Firm* — SNELL & WILMER L.L.P

(57) ABSTRACT
System/Method/Device for labelling images in an auto-mated manner to satisfy a performance of a different algo-rithm and then applying active learning to learn a deep
(Continued)

learning model which would enable 'real-time' operation of quality assessment and with high accuracy.

19 Claims, 12 Drawing Sheets

(51) Int. Cl.

| | |
|---|---|
| *G06V 10/74* | (2022.01) |
| *G06V 10/774* | (2022.01) |
| *G06V 10/776* | (2022.01) |
| *G06V 10/82* | (2022.01) |
| *G06V 10/94* | (2022.01) |
| *G06V 20/50* | (2022.01) |
| *G06V 40/18* | (2022.01) |

(52) U.S. Cl.

CPC .......... *G06V 10/774* (2022.01); *G06V 10/776* (2022.01); *G06V 10/82* (2022.01); *G06V 10/95* (2022.01); *G06V 20/50* (2022.01); *G06V 40/197* (2022.01); *G06T 2207/10016* (2013.01); *G06T 2207/10101* (2013.01); *G06T 2207/20081* (2013.01); *G06T 2207/20084* (2013.01); *G06T 2207/30041* (2013.01)

(58) Field of Classification Search

CPC . G06T 2207/20081; G06T 2207/20084; G06T 2207/30041; G06V 40/197; G06V 10/761; G06V 10/82; G06V 10/95; G06V 20/50; G06V 10/774; G06V 10/776

USPC ........................................................ 348/78

See application file for complete search history.

(56) References Cited

U.S. PATENT DOCUMENTS

| | | | | |
|---|---|---|---|---|
| 11,298,017 | B2 * | 4/2022 | Tran ....................... | A61B 3/107 |
| 11,645,579 | B2 * | 5/2023 | Farré Guiu ........... | G06N 20/00 |
| | | | | 706/12 |
| 2008/0075335 | A1 | 3/2008 | Martin et al. | |

OTHER PUBLICATIONS

Leyuan.W et al. "Recognition Oriented Iris Image Quality Assessment in the Feature Space", 2020 IEEE International Joint Conference on Biometrics (IJCB), IEEE, Sep. 28, 2020 (Sep. 28, 2020), pp. 1-9, XP033871235, DOI: 10.1109/IJCB48548.2020.9304896 [retrieved on Dec. 22, 2020].

* cited by examiner

| Model | Cubes | B-scans per cube | Total B-scans | Accuracy | Training time (in mins) | Co2 emission in kg CO2 eq. for training time | Annotation time in hours* |
|---|---|---|---|---|---|---|---|
| BSOI-128 | 478 | 128 | 61184 | 94.6% | 378 | 0.49 | 80 |
| BSOI-R96 | 478 | 96 | 45888 | 91.6% | 283 | 0.37 | 60 |
| BSOI-R64 | 478 | 64 | 30592 | 91.0% | 192 | 0.25 | 40 |
| BSOI-R32 | 478 | 32 | 15296 | 85.2% | 116 | 0.15 | 20 |
| BSOI-SqD96 | 478 | 96 | 45888 | 92.7% | 296 | 0.38 | 60 |
| BSOI-SqD64 | 478 | 64 | 30592 | 91.4% | 230 | 0.29 | 40 |
| BSOI-SqD32 | 478 | 32 | 15296 | 85.9% | 114 | 0.15 | 20 |
| BSOI-CC96 | 478 | 96 | 45888 | 93.5% | 274 | 0.36 | 60 |
| BSOI-CC64 | 478 | 64 | 30592 | 92.6% | 245 | 0.32 | 40 |
| BSOI-CC32 | 478 | 32 | 15296 | 87.2% | 109 | 0.14 | 20 |

FIG. 7

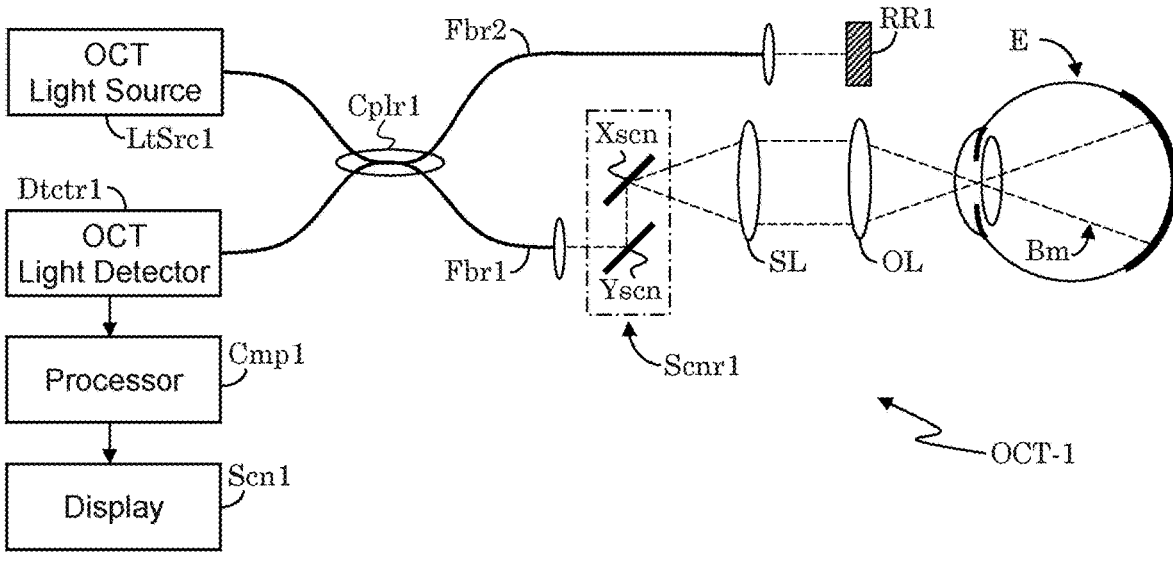
FIG. 9
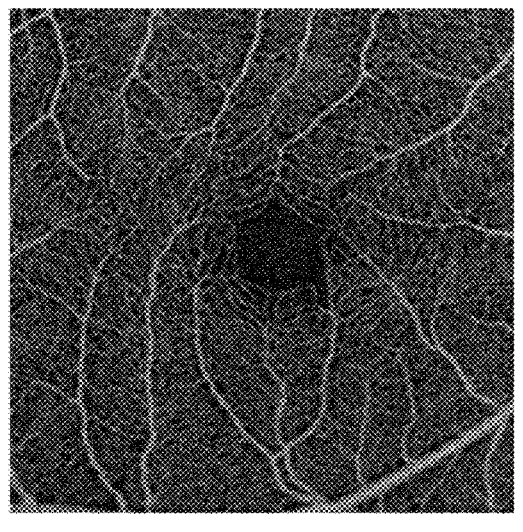
FIG. 11
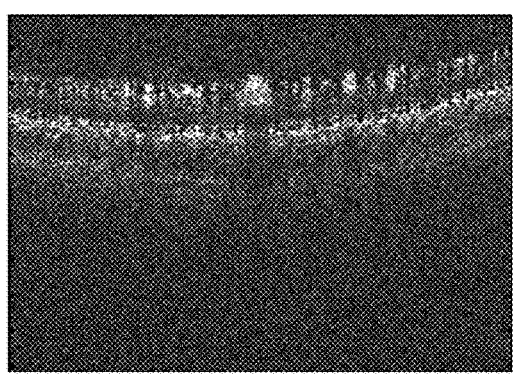
FIG. 12

FIG. 10

Layr1: Inner Limiting Membrane (ILM)
Layr2: (Retinal) Nerve Fiber Layer (RNFL or NFL)
Layr3: Ganglion Cell Layer (GCL)
Layr4: Inner Plexiform Layer (IPL)
Layr5: Inner Nuclear Layer (INL)
Layr6: Outer Plexiform Layer (OPL)
Layr7: Outer Nuclear Layer (ONL)
Layr8: Junction between Outer Segments (OS) and Inner Segments (IS)
Layr9: Externa/Outer Limiting Membrane (ELM/OLM)
Layr10: Retinal Pigment Epithelium (RPE)
Layr11: Bruch's Membrane (BM)

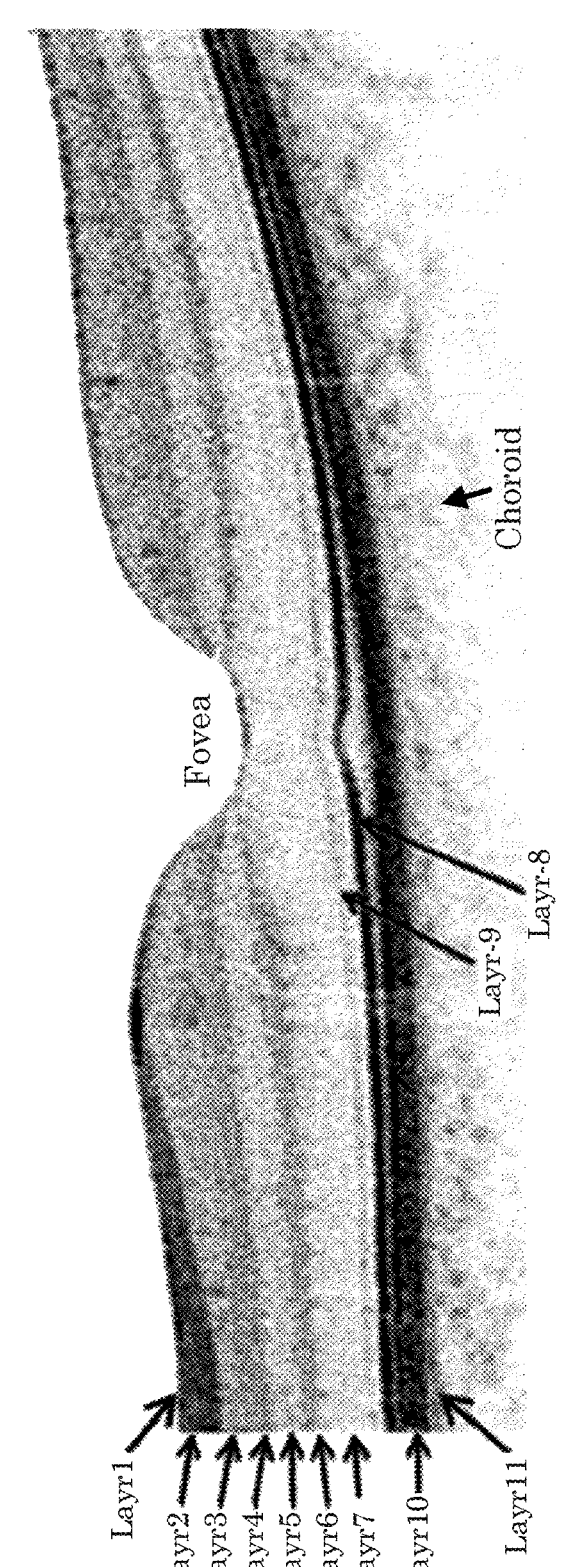

SEMI-SUPERVISED FUNDUS IMAGE QUALITY ASSESSMENT METHOD USING IR TRACKING

CROSS REFERENCE TO RELATED APPLICATIONS

This application is a U.S. national stage entry under 35 U.S.C. § 371 of International Application No. PCT/EP2022/054828 filed Feb. 25, 2022 entitled "SEMI-SUPERVISED FUNDUS IMAGE QUALITY ASSESSMENT METHOD USING IR TRACKING." The '828 PCT claims priority to, and the benefit of, U.S. Provisional Application Ser. No. 63/154,177 filed on Feb. 26, 2021, entitled "USING IMAGE SIMILARITY SCORE TO SELECT IMAGES FOR TRAINING DEEP LEARNING MODELS FOR BETTER UTILIZATION OF ANNOTATION AND COMPUTATIONAL RESOURCES." The '828 PCT claims priority to, and the benefit of, U.S. Provisional Application Ser. No. 63/154,504 filed on Feb. 26, 2021, entitled "SEMI-SUPERVISED FUNDUS IMAGE QUALITY ASSESSMENT METHOD USING IR TRACKING." Each of the foregoing applications are hereby incorporated by reference in their entirety for all purposes.

FIELD OF INVENTION

The present invention is generally directed to tools for automatic fundus imaging, and more specifically to machine learning tools/models trained to provide image quality assessment (IQA).

BACKGROUND

Fundus images have many applications, including disease detection, retinal motion tracking, and alignment determination prior to application of another imaging modality, such as optical coherence tomography. It is desirable to automate these, and other applications, that make use of fundus images. Assuring the use of high quality fundus images is of importance to both automatic and manual applications. It is therefore desirable to avoid the use of bad quality fundus images in such applications. Automated fundus image quality assessment (IQA) tools/algorithms are tools that automate the differentiating of good quality fundus images from lower quality fundus images. For example, IQA may assign a quality metric to fundus images to determine if they are of high enough quality to be submitted to a secondary tool for disease detection, motion tracking, and alignment determination, etc. If the IQA determines that an image is not of sufficiently high quality, then that image may be discarded or not submitted to the secondary tool.

It is an object of the present invention to improve the performance of automated fundus image quality assessment (IQA) tools.

It is another object of the present invention to automate the labeling of images used for training a machine learning model.

It is a further object of the present invention to provide a method of continually improving the performance of a machine learning tool/model after deployment.

It is still another object of the present invention to provide a deep learning tool (e.g., neural network (NN)/convolutional NN/U-Net) for automatic fundus image quality assessment whose training is continuously updated after deployment into the field.

SUMMARY OF INVENTION

Generally, using deep learning methods for image quality assessment (IQA) requires vast amounts of labelled data (e.g., a training set of good image and bad image examples). This cumbersome process may be partly circumvented by providing initial labelling of the images in an automated manner to satisfy the performance of a different algorithm (e.g., motion tracking, tissue identification, etc.), and then providing secondary/subsequent labeling of images by use of Active Learning (e.g., a machine learning approach wherein a learning algorithm can interactively query a user (or some other information source), or otherwise receive additional information to label new data points with desired outputs, e.g., provide additional training samples) to learn/train a deep learning model, which would enable 'real-time' operation of quality assessment and with high accuracy.

The above objects are met in an ophthalmic imaging device having: an imaging unit for capturing a sequence of images of a patient's eye; an image assessment unit configured to, for one or more sample images selected from among the sequence of images, determine a similarity measure between each sample image and one or more other images in the sequence of images; and a (deep) learning model trained to assign a classification to an input image. The imaging unit may be an imaging system for imaging the anterior segment of the eye (e.g., a pupil/iris camera such as a Line Scanning Ophthalmoscope (LSO) and/or an infrared-reflectance (IR) imaging device), an imaging system for imaging the posterior segment of the eye (e.g., infrared (IR) or non-IR fundus camera), an optical coherence tomography (OCT) system, or an OCT angiography (OCTA) system. The learning model is retrained using a selection of the assessed sample images based on their respective similarity measure.

For example, the learning model may be updated by retraining a stored version of the learning model, and the retrained version of the learning model replaces the existing learning model. The stored version of the learning model may be stored and retrained within the ophthalmic imaging device, or may be stored and retrained at the remote service site. If retrained at a remote service site, the ophthalmic imaging device may also include a computer network communication system for transmitting (e.g., over the Internet, on a wide area network, or local area network) assessed images (and their associated similarity measures and/or assigned classifications) to the remote service site, which uses this received information to retrain its stored version of the learning model, and transmits the retrained learning model to the ophthalmic imaging device to replace the existing learning model at the device.

When the learning model assigns a classification to an input image, the learning model also designates a confidence measure to its assigned classification. Optionally, assessed images whose classifications have designated confidence measures above a predefined threshold (e.g., 80% or 90%, and are deemed high confident predictions/classifications) may also be used to retrain the learning model. Alternatively, or additionally, assessed images whose assigned classifications have a confidence measure below a predefined threshold (e.g., lower than 40%, 30% or 20%) may be flagged for manual inspection and selective reclassification based on the visual inspection. For example, this manual inspection may be part of an initial training session of the learning model, or if the trained model is already being used in the field, the flagged images being transmitted to the remote service site and manually inspected remotely.

In one exemplary implementation, the learning model is trained to assign a first classification (e.g., a classification of "good" or "acceptable quality") indicating that an input image is suitable for further processing and a second classification (e.g., a classification "bad" or "poor" or "unacceptable quality") indicating that an input image is not suitable for further processing. For example, if the image assessment unit is a motion tracking system, the similarity measure may be based on motion tracking parameters determined by the motion tracking system, and the assessed sample images may be assigned the first classification label based on their respective similarity measure. The learning model may then be trained or retrained using the assessed sample images that received the first classification from the image assessment unit (as training input image examples paired with their assigned classifications as training target outputs). Optionally, the learning model may output its classification to the motion tracking system (e.g., the image assessment unit) for further processing. For example, the output from the learning model may specify which images are suitable for determining motion tracking, or may specify which images are suitable for use as reference images. This effectively constructs a feedback sequence between the image assessment unit and the learning model so as to continuously improved the retraining of the learning model and the effectiveness of the motion tracking system (at least until a predefined success rate (e.g., 97%) is reached).

Alternatively, the output of the learning model may be submitted to an image processing module (e.g., a secondary deep learning model local to, or remote from, the ophthalmic imaging device, or an auxiliary operation of the learning model) configured to identify a tissue type within the input image. For example, images to which the learning model assigns the first classification (e.g., suitable for further processing) may be submitted to the image processing module, and images that are assigned the second classification (not suitable for further processing) are not submitted to the image processing module.

An example of this application would be if the imaging unit were an optical coherence tomography (OCT) unit, the sequence of images were a sequence of B-scans that define a cube-scan, and the learning model or the image processing unit were trained to identify a tissue type within a B-scan. This approach would help reduce the number of B-scans needed to train or retrain the machine model and/or image processing unit by limiting the B-scans used for training to those within a cube-scan that are most dissimilar to the other B-scans within the same cube-scan. The most dissimilar B-scans may be determined by their respective similarity measures, which may be based on the square differences (SqD) or the cross correlation (CC) of a B-scan being assess and the other B-scans in the same cube-scan.

In another embodiment, the sequence of images is divided into a multiple image groups (e.g., of sequential images). A select image within each image group is designated a reference image, and the similarity measure is based on the similarity between the sample image and the reference image corresponding to the same image group to which the sample image belongs. Optionally, the images within each image group may be ordered based on their original sequence within the sequence of images.

Another embodiment that uses image groups would be if the learning model were configured to receive a plurality of input images as an input image group, and assigns the classification to at least one image within the input group (e.g., the first image in the input image group), or assigns the same classification to all the images in the group. In this approach the machine learning model would have been trained with input image groups as training inputs, and the classification of one of the images in the input image group being used as the training target outputs. If the classification is that of an "acceptable quality" label and "unacceptable quality", then the training target output may be set depending upon whether all the images within the input image group have the same label or not. If all the images within an input image group have the same label, then that same label is used as the training target output for the input image group. If the labels of all the images in an input image group do not agree, then the training target out is set to "unacceptable quality".

Optionally in the above-described embodiments, the learning model may alternatively or additionally assign to an input image a classification that is an indicator (or factor used in the determination) of motion tracking, image quality assessment (IQA), fluid flow, tissue structure, or decease disease type.

A fuller understanding of the invention will become apparent and appreciated by referring to the following description and claims taken in conjunction with the accompanying drawings.

Several publications may be cited or referred to herein to facilitate the understanding of the present invention. All publications cited or referred to herein, are hereby incorporated herein in their entirety by reference.

The embodiments disclosed herein are only examples, and the scope of this disclosure is not limited to them. Any embodiment feature mentioned in one claim category, e.g. system, can be claimed in another claim category, e.g. method, as well. The dependencies or references back in the attached claims are chosen for formal reasons only. However, any subject matter resulting from a deliberate reference back to any previous claims can be claimed as well, so that any combination of claims and the features thereof are disclosed and can be claimed regardless of the dependencies chosen in the attached claims.

BRIEF DESCRIPTION OF THE DRAWINGS

In the drawings wherein like reference symbols/characters refer to like parts:

FIG. 7 is a table comparing the results of using the present invention with OCT data to select specific B-scans for training a learning model, as opposed to other methods of selecting training data.

FIG. 9 illustrates a generalized frequency domain optical coherence tomography system used to collect 3D image data of the eye suitable for use with the present invention.

FIG. 10 shows an exemplary OCT B-scan image of a normal retina of a human eye, and illustratively identifies various canonical retinal layers and boundaries.

FIG. 11 shows an example of an enface vasculature image.

FIG. 12 shows an exemplary B-scan of a vasculature (OCTA) image.

DESCRIPTION OF THE PREFERRED EMBODIMENTS

Figure 1:
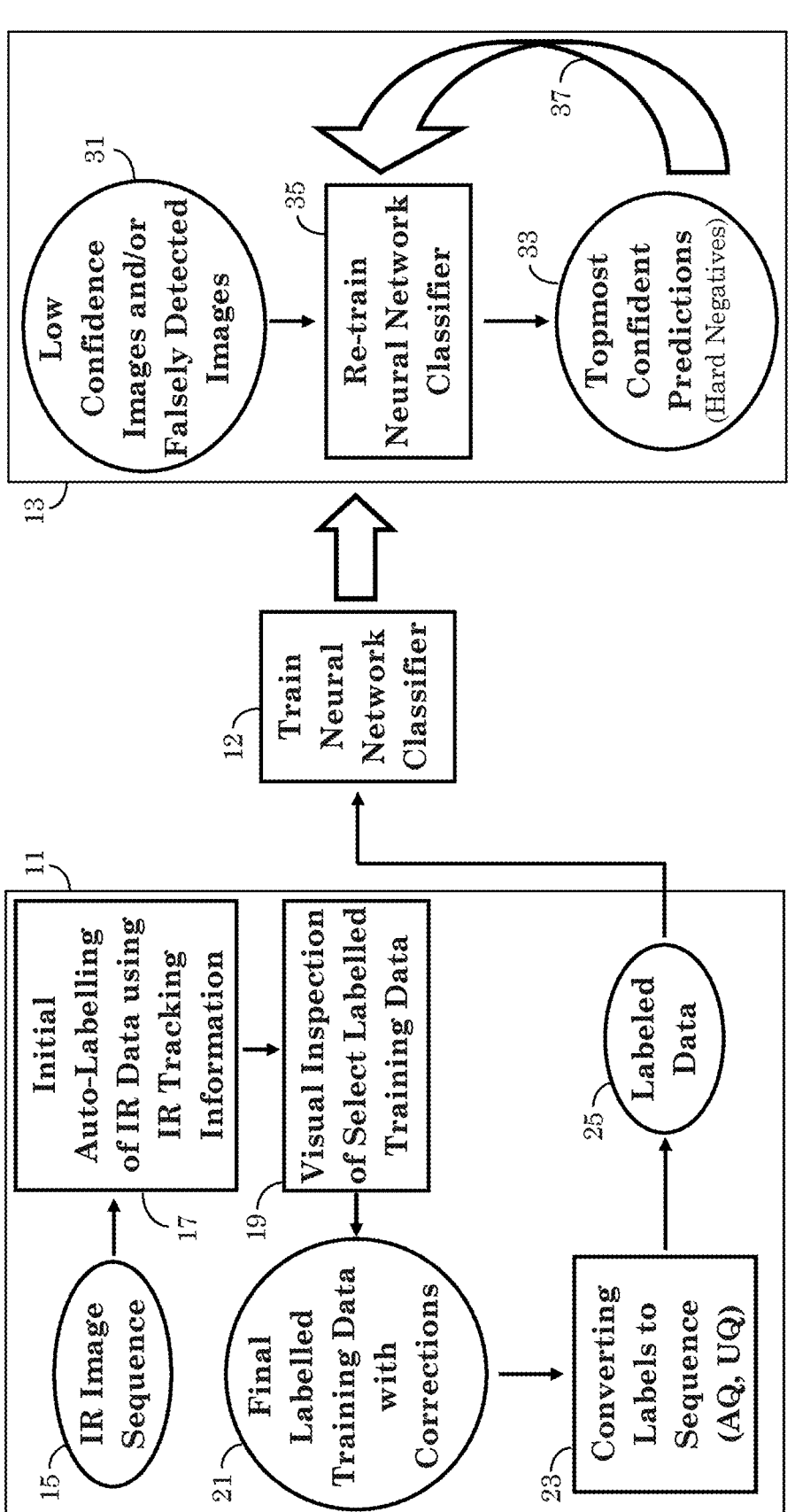
FIG. 1 is a visual depiction of a workflow in accord with the present invention.

In optical coherence tomography (OCT) acquisition systems, fundus images may be used for retinal tracking. Fundus image acquisition can be challenging due to fixation changes, artifacts, out of focus issues, etc.

Real-time and efficient tracking of fundus images is important in automated retinal OCT image acquisition. For example, an OCT system may capture a sequence (e.g. series) of fundus images for tracking using a Line Scanning Ophthalmoscope (LSO) and/or an infrared-reflectance (IR) imaging device.

Within a sequence of captured images (e.g., 50 to several hundred), a reference image can be used to track motion in subsequent images. Insufficient reference image quality, such as due to the presence of various artifacts, can affect the performance of the tracking algorithm and thereby reduce its success rate and reliability. The quality of images (e.g., both the reference image and those in the sequence used for motion tracking) can vary significantly in time depending on, for example, fixation, focus, vignetting effects, the presence of eye lashes, and stripes and central reflex artifacts. Therefore, there is a need for a method that can select a high-quality reference image from among a sequence of images. In other words, a robust retinal tracking utility is dependent upon the quality of the reference image (and/or the images in the sequence of images). Therefore, a robust image quality assessment of fundus images is crucial for robust retinal tracking.

Within a retinal tracking context, automated fundus Image Quality Assessment (IQA) is a method of analyzing the quality of a fundus image. A robust IQA algorithm may be based on deep learning algorithms (or other machine learning methods). A deep learning algorithm may rely on ground truth reference images (e.g., predefined training images deemed to be representative of good fundus images and/or bad fundus images) in order to train a network (e.g. a neural network or other machine learning types/architectures). Labeled ground truth references (e.g., training image examples) can be generated/captured and/or labeled.

Subjective IQA and Objective IQA are two methods that can be used to generate labeled ground truth, training images to train an IQA model, algorithm, and/or system.

1) Subjective IQA is performed by human graders which can be used to generate labeled training data (e.g., sample images as training inputs paired with their associated labels as training target outputs) for supervised machine/deep learning methods. Subjective IQA is a very costly and tedious process that makes it unsuitable for a supervised (e.g., learning) method. The lack of consistent agreement between human graders is another problem with this method.

2) Objective IQA is a method of assessing the quality of an image by means of algorithmic models with an intention to produce results that satisfy the performance of a different algorithm, such as retinal tracking. Objective IQA assigns a grade to an individual image in isolation, based on its inherent properties, e.g., based on its peak signal-to-noise ratio, noise quality measure, etc. In contrast, some features of the present invention may use one or more comparison measure (e.g., difference and/or similarity measure) between an image being graded and a reference image or another image in a series/sequence of images to, at least in part, determine a (e.g., good/bad) label for the image being graded.

For example, prior methods addressing this problem either used a knowledge-based algorithm, as described in U.S. Pat. No. 8,811,657, for the IQA assessment of fundus images, or relied on deep learning algorithms based on hand labelled ground truth images, such as described in: Chalakkal et al., "Quality and Content Analysis of Fundus Images Using Deep Learning", *Computers in Biology and Medicine,* 108 (2019): 317-331; Yu, FengLi, et al. *"Image Quality Classification for DR Screening Using Deep Learning."* 2017, 39$^{th}$, Annual *International Conference of the IEEE Engineering in Medicine and Biology Society* (EMBC), IEEE, 2017; and Saha, Sajib Kumar, et al. *"Deep Learning for Automated Quality Assessment of Color Fundus Images in Diabetic Retinopathy Screening,"* arXiv preprint arXiv: 1703.02511 (2017). Some standard deep learning architectures, such as Visual Geometry Group (VGG)-16 (e.g., 16 convolutional layers), Residual Neural Network (ResNet)-50 (e.g., 50 layers deep), and EfficientNet-B0 (a convolutional neural network that is trained on more than a million images from the ImageNet database), can work well with classification problems, but they require immense amounts of labelled data for training, which may not be readily available for fundus images (or other imaging modalities within the field of ophthalmology, in general).

Heretofore, neither approach has provided an optimal solution. The subjective method required a lot (e.g., an impractical amount) of human resources, and the objective method for automatically labelling images has not provided sufficiently reliable training sets, e.g., they could contain an undesirable number of outliers that could ill-affect the training of machine learning algorithms.

In the present invention, the requirement for vast amounts of labelled data for training deep learning models/methods for IQA is partly circumvented by labelling ophthalmic training images (e.g., fundus images) in an automated manner to satisfy the performance of a different algorithm (e.g., a retinal tracking algorithm/system and/or an OCT/OCTA imaging system) and then using active learning to learn/ teach a deep learning model, which would enable 'real-time' operation of quality assessment with high accuracy.

In an exemplary application, the present invention provides a multi-step method to automatically generate labeled training images for a machine learning-based (e.g., a deep learning-based) fundus image quality assessment algorithm/ learning model. Previous methods either used a knowledge-based algorithm for the IQA assessment for fundus images or relied on hand labelled ground truth images. The present approach provides the benefit of automatic labelling of training images, and also makes use of active learning to augment the training image set and to make the present models more robust and accurate over time (e.g., as it is being using used in the field). The present deep learning-based approach (e.g., the trained deep learning model) also provides real-time processing times (e.g., about 50 ms in a CPU environment, e.g., a processing environment based on a typical central processing unit (CPU), as opposed to an application specific integrated circuit (ASIC), a programmable logic device, or a general purpose graphics processing unit (GPGPU) optimized/specialized for deep learning-based (neural network) applications) while not sacrificing performance. The performance can be compared against (e.g., is comparable to) using standalone deep learning architectures, such as VGG-16, ResNet-50, and EfficentNet-B0, which can also be used to classify image quality.

Herein is presented an exemplary embodiment of a multi-step method to automatically generate labeled training images by use of a fundus-image quality assessment algorithm (image assessment unit). The labeled training images may be used as part of initial training of a learning model and/or used for ongoing retraining of the learning model once it being used in the field.

The first step is based on a motion tracking algorithm/system, such as tracking of the anterior or posterior segment of the eye, and in an exemplary implementation may be based on a retinal tracking algorithm/system. As it would be understood, many ophthalmic devices, such as OCT systems, use tracking systems to track device and/or patient motion to assure accurate capturing of an ophthalmic image and/or to assure that a specific target area (region of interest, ROI) of an eye (e.g., the anterior segment and/or posterior segment) is captured. Typically, an imaging unit captures hundreds of image samples in sequence during application of an image tracking system (e.g., image assessment unit), and the image tracking system typically provides some metrics (e.g., similarity measures) to determine if tracking is successful or uncertain. The present example proposes to generate/provide a large number of training images (with minimal effort) by utilizing the vast number of images available from such image tracking algorithms to train a machine learning model (particularly if the metrics produced by theses image tracking algorithms are used to provide (or augment) automatic labeling these captured images). Generally, retinal tracking systems use a reference image with a set of extracted landmarks from the reference image. Then, the tracking algorithm tracks live images (e.g., from the sequence of images) using the landmarks extracted from the reference image by searching for similar landmarks in each live image (e.g., sample image). The tracking problem can be considered as the registration between the reference and a live image. The quality of registration and tracking (e.g., tracking metrics) between the reference image and a live image can be determined from:

1. The quality of landmark matching (e.g. by measuring the similarity of two landmark areas, such as by cross correlation, or cross entropy, or other statistical similarity measurement between subareas centered at the landmarks),
2. The distribution of landmark matches (e.g. by measuring the convex hull and/or bounding box/region of the landmarks in the live image), with a larger distribution of landmark matches across the entirety of an image (or ROI) being preferred (e.g., landmark matches spread over not less than 50% of the image area under consideration) and considered good tracking, indicating (meaning) a good image.
3. The image-to-image registration quality between the reference image and a live (or sample) image (e.g. by measuring the similarity between the reference image and the transformed live/sample image), and/or
4. A measure of the transformation between two images (e.g. determined by the amount of motion, or by measuring the mean error between the transformed landmarks from the reference image (e.g., first image) to the moving image (e.g., second image). For example, a live image may be transformed to better line up its matched landmarks to those of the reference image.

A registration/tracking quality index (e.g., an overall similarity measure) may be calculated based one or more of above metrics (e.g., individual similarity measures). For instance, Bayesian methods can be used to calculate this registration/tracking quality index as a posterior probability.

The present invention may be applied to different types of fundus images or other types of ophthalmic images (e.g., different imaging modalities, such as OCT B-scans), but for ease of discussion is herein presented (in the present example) as applied to IR fundus images. An IR fundus image (or other imaging modality) tracking algorithm/system can be used to (automatically) generate labeled training data based on the calculated registration/tracking quality indices (similarity measures), and this labeled training data may then be used to train an image quality assessment IQA machine model. Labeling of this training data may include the following.

Starting with a sequence of IR images from the same eye:
Select one of the images as the reference image automatically or manually. For example, a reference image may be selected automatically as being the first image in a sequence of images. For example, the reference image may be set to the captured image right before acquisition (and storage of acquired images) starts when an operator finishes aligning the patient carefully. This reference image right before the formal acquisition starts is expected to be of good quality. Alternatively, other simpler statistical measurements, such as image brightness and contrast measurement, can be used to evaluate the quality of an image (in a sequence of images) after alignment to automatically select a reference image (from among the sequence of images). Further alternatively, a full sequence of images from an image tracking system may be divided into multiple smaller image sequences (e.g., sequences consisting of fewer images than the full sequence), and a select one from each smaller sequence of images (e.g., the first image in each smaller sequence) may be selected as the reference image for that smaller sequence. A more sophisticated algorithm for automatic selection of a reference image may also be used to identify, and perhaps avoid, images containing a blink, a partial blink, or other sources of error. For example, once the learning model is trained, the same learning model may provide IQA functionality and be used to identify images within a sequence of images that are suitable for processing by the retinal tracking algorithm. The trained learning model may also be used to select one or more reference images within a sequence of captured images.
Register and track remaining images in the sequence of IR images using the reference image,
For a two-class classification:
a) Select/assign the images with a registration/tracking quality index (similarity measure) above a given/predefined (first/upper) threshold a first label/classification (e.g., "good" or "acceptable quality" AQ classification), b) Select/assign the images with a registration/tracking quality index below a given/predefined (second/lower) threshold a second label/classification (e.g., "poor" or "bad" or "unacceptable quality" UQ classification), Note that the images in the sequence of IR images can be divided into more classes based on their registration/tracking quality to the reference image (e.g., by using additional thresholds). Alternatively, instead of using two classifications (e.g., good vs bad quality), the algorithm could classify the images in three (e.g., bad, acceptable, and good) or more categories. Also, the algorithm could output the probability (e.g., a number between 0 and 1) of the image quality classification being accurate (e.g. a confidence measure), which may be checked against a threshold or multiple thresholds for final classification of an image.

Use the labeled images (e.g., images labels as "good" and/or "bad") for training and validation to create a machine/deep learning model that can examine an input image (input to the learning model) and assign a similar classification type (e.g., first or second classification) with a confidence measure for each assigned classification. Although a two-class classification (first vs second, or good vs bad) is used in the present example, multiple probabilities or additional classes (i.e., multiclass) may be defined for classification, such as described above.

The second step is based on Active Learning. Even though the automated labelling provides a starting off point as to what might be considered a "good" and/or "bad" quality image, there can be more ambiguous examples that might arise, sometimes quite often. This is where Active Learning will help bridge the gap over these obscure cases by having an initially deep learning model trained on the automatically labelled data.

Active Learning can be used to sample unlabeled data points or data points with low confidence (e.g., unlabeled IR images not previously used to train the initial deep learning model) into a retraining set in many ways. One exemplary approach is to:

Resort the dataset based on the predicted network confidence value/metric for every image in the dataset. For example, one may run the network prediction (or learning model) on a new test data set (e.g., existing image samples not used in the initial training of the network or additional image samples acquired in the field) and then sort the results based on the confidence values (the neural network provides a confidence measure/metric along with its classification output), and use the high confidence images (e.g., above a predefine threshold, such as 0.90) to retrain the network (e.g., learning model) and improve the learning model. Additionally or alternatively, low confidence results (e.g., below a predefined confidence threshold, such as 0.25) and/or hard negatives (e.g., false positives and/or false negatives) may be manually re-evaluated and relabeled/reclassified to retrain the network.

Alternative or additional methods for thresholding the confidence values may use different strategies to pick examples that enhance learning. These thresholding strategies may include:

a) Identifying high confidence scores after sorting or setting a high value of confidence threshold. For example, this step may exclude the training data with ambiguous labels, e.g., low confidence scores or labels not much above/below their thresholds (e.g., within 10-30% of the threshold values).

b) Manually labelling, or relabeling, the more ambiguous images (low confidence scores) can also be done. For example, data (e.g., images) with low confidence prediction may be manually relabeled as "good" or "bad" images, as appropriate. The manual labelling may be accomplished at remote service site, as discussed below, if this service is not available locally.

Measure the change in generalization performance and reevaluate sampling strategy. This reevaluation may be based on an increased validation score. For example, labeled data may be added into the training set using the above strategy until no improvement is seen in the performance of the validation score.

This procedure may be implemented using various well-known neural network architectures, such as VVG-16, ResNet-50, and EfficentNet-B0, and/or a custom-defined simpler architecture that satisfies runtime needs may also be used. Additional example neural network architectures suitable for the present invention are provide below.

This approach permits the training of better models with minimal manual labelling effort. This approach/method conceptually may also be used in other cases where it is a relatively low effort to label data in an automated/semi-automated manner.

An exemplary implementation of the present invention is provided hereinbelow. The general method of the present invention, as illustrated in FIG. 1, may be implemented in within a single ophthalmic imaging device or may be divided/distributed between a local ophthalmic imaging device and a remote service site.

The present example is a semi-supervised method for Infrared-reflectance (IR) image quality assessment. The determination of IR image quality is paramount to the effectiveness of eye motion tracking algorithms which enable reduced motion in optical coherence tomography (OCT) image acquisition. In this implementation, a data driven approach for IR image quality classification is created with minimal manual labeling effort for real time use.

FIG. 1 illustrates a method in accord with the present invention. Although the present example is shown applied to IR fundus images, it is be understood that the present invention may equally be applied to other types of fundus images, or other types of ophthalmic images (e.g., color fundus images, fluorescein angiography, OCT, OCTA, etc.). Block 11 illustrates a process for preparing training data with automated labelling (e.g., training image/label pairs). In the present example, an image-based IR tracking algorithm is used to generate training data that is then used to train a neural network (e.g., learning model) 12. In step 15, a sequence of IR images (or other fundus images, OCT images, etc.) is generated/captured. In the present example, a CLARUS™ 500 (ZEISS, Dublin, CA) was used to collected 9,659 samples of data (IR images) from eight subjects (patients) for nine different fixations, including central and peripheral fixations. It is to be understood that sample images may also be acquired from archive sources. In step 17, initial, automatic labeling (e.g., acceptable (or "good") quality "AQ" and/or unacceptable (or "bad") quality "UQ") of the image data was accomplished by use of the IR tracking information (e.g., tracking metric(s) and/or registration/tracking quality index and/or other similarity measures, as is explained above). For example, a confidence measure may be determined as described above and/or based on metrics of images that were well suited for tracking (e.g., provided good tracking information) could be used to identify and/or label AQ images, and metrics of images that were rejected or not well suited for tracking could be used to identify and/or label UQ images. Thus, a dataset of acceptable quality (AQ) and unacceptable quality (UQ) IR images dataset for tracking purposes was generated.

The tracking algorithm/system, which relies on generating landmark points in two images (e.g., a reference image and a subsequent image in a sequence of images) and comparing them, was used to create rules for classifying AQ and UQ images. The first IR tracking image may be used as a reference image for each fixation, which may also be reviewed manually, if necessary. Optionally, low confidence images or a sampling of rejected images from step 17 may be manually/visually inspected and relabeled as AQ or UQ, if necessary, as shown in step 19. A final set of labelled training data (with corrections, if any) is thus produced (step 21). In the present example, the tracking output landmark number and landmark distribution were used as a measure of IR moving image quality to generate an initial training set divided into the AQ and UQ classes (step 23).

Optionally, a grader may quickly review the initial training set in a short amount of time to correct misclassifications in the training set. The labeled data 25 may be input to a neural network 12 for training.

Figure 2:
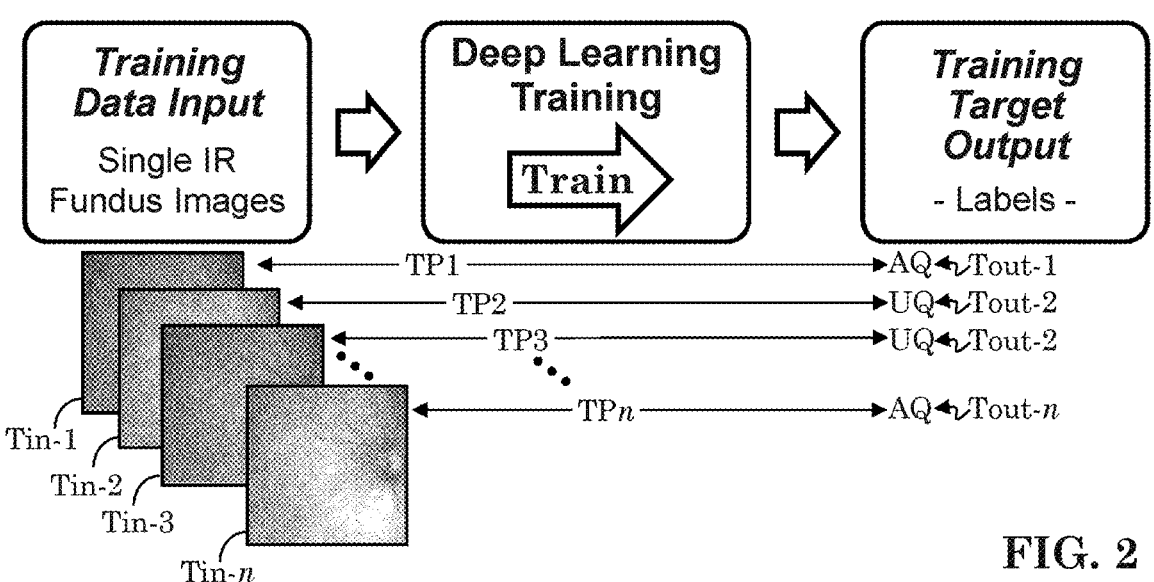
FIG. 2 provides a first example of training a neural network (e.g., 12 from FIG. 1).

FIG. 2 provides a first example of training a neural network (e.g., 12 from FIG. 1). Multiple training pair TP1 to TPn are defined. Each training pair may consist of a training input sample/image Tin-1 to Tin-n and its corresponding target training output Tout-1 to Tout-n (e.g., target training output sample/label, such as AQ or UQ) from step 25 in FIG. 1). During a training phase, the neural network 12 is thus trained on single scan images Tin-1 to Tin-n as training inputs and their associated labels as corresponding target training outputs Tout-1 to Tout-n. Training may be by back-propagation process, as described below, or by any other appropriate training method.

Figure 3:
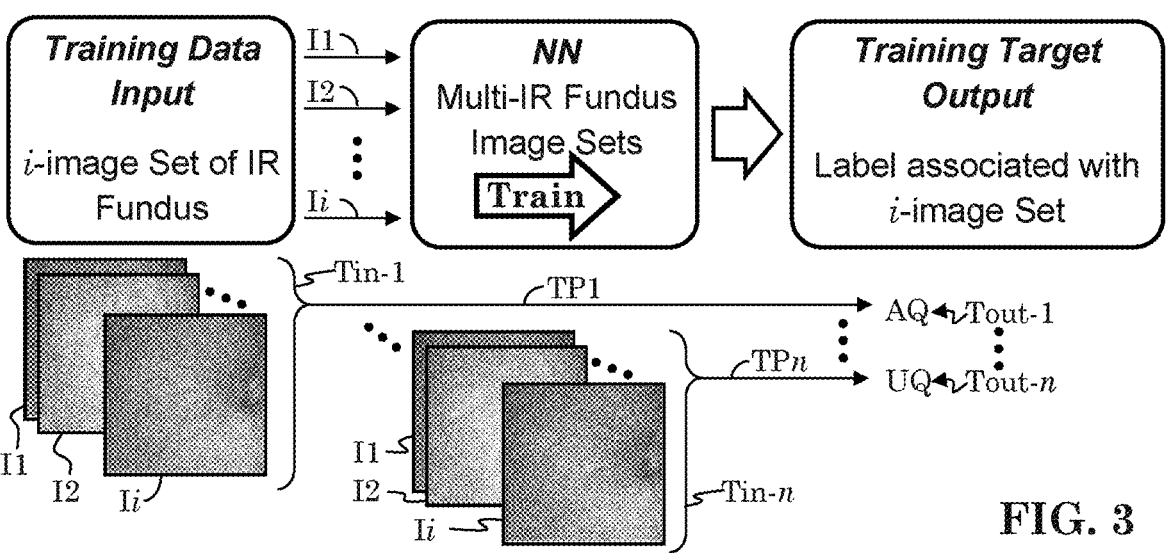
FIG. 3 shows a second example of training a neural network (e.g., 12 from FIG. 1).

Alternatively, FIG. 3 shows a second example of training a neural network (e.g., 12 from FIG. 1). In the present example, the labeled training images (e.g., from step 25 in FIG. 1) may be arranged into groups/sets of sequenced imaged I1 to Ii to define each training input (set) Tin-1 to Tin-n of each training pair Tp1 to Tpn. In this manner, each training input sample Tin-1 to Tin-n consists of a plurality of images I1 to Ii arranged in sequence. For example, each training sample Tin-1 to Tin-n may consist of three sequential images, or other appropriate number, whose sequence is determined by the sequence/order in which they were captured by the motion tracking system. In this case, the corresponding target training outputs Tout-1 to Tout-n may be assigned the value (label) of the first image I1 (or another select image in the set I2-Ii) in each training input set Tin-1 to Tin-n. Alternatively, the corresponding target training outputs Tout-1 to Tout-n may be set to the consensus of the images in the input set. For example, if all three images in a training input set (or however many images are in a current training input set) have a label of "AQ", then the target training output for this is set to AQ for this set. However, if all three a training input set have a label of "UQ" (or if the label of all the training images in the current input set do not agree), then the target training output for this is set to UQ for this set. Further alternatively, the label of "AQ" or "UQ" may be set based on the assigned label type of the majority of the images in the input set.

After the machine learning model is trained, and is used in a validation process or in operation out in the field, the number of input images it receives (as an input set) for verification/classification may be set to match the number used to train the machine model. The number of verification/ test images in an input set may reflect those of how the machine learning model was trained. For example, if the machine learning model was trained using single input images (e.g., the method of FIG. 2), the device using this learning model in the field would accept one input image at a time. However, if the machine learning model was trained using groups of consecutive input images as training input sets (e.g., 3 consecutive images at a time), like that of FIG. 3, then three consecutive images (or whatever the number of consecutive images in the training input set) may be input to the trained machine learning model when used in the field.

Optionally the number of training sample pairs may be increased by using a patch-based scheme, or image rotation/transformation, or other sample augmentation process, to increase the number of available training pairs. For example, a sample may be rotated to provide another view, and/or a full-size image may be divided into multiple, similarly sized and corresponding image-segments (e.g., patches). However, since the present approach of generating training image samples from a motion tracking system, which produces a large number of relevant training pairs, the need for training sample augmentation is reduced, or eliminated.

Thus, as described above, training inputs to the neural network 12 may be three or more adjacent temporal frames of the IR images (e.g., 3-channel image inputs and/or three or more temporally sequential images). In addition to the approach described above, or alternatively, a sequence of training images/frames may be labelled AQ only if all three (or other predefined number of sequential) frames are of AQ quality according to the pipeline output of the reference image-based IR tracking algorithm (block 11), or the sequence may be labelled UQ if all three frames are of UQ quality or if not all are of AQ quality. A VGG style network (or other deep learning method or type of convolutional neural network) is exemplary trained on this dataset to predict the quality of given image.

After an initial round of training, the trained learning model 12 is improved by the process of block 13, which augments the training by providing/generating additional training samples for updating/retraining the learning model. The process of block 13 may be implemented locally within a local device hosting/using the trained learning model 12, or remotely from the local device, or partly locally and partly remotely, as described below. Generally, there is an abundance of low confidence images and/or falsely detected images (e.g., hard negative samples), or UQ labeled images, and these may constitute additional training sample (block 31) for refining/retraining (block 35) the previously trained network (learning model) 12. Alternatively or additionally, supplemental training samples (block 31) may also be provided by an ophthalmic device while actively being used in the field. The process of block 13 may be implemented locally within an ophthalmic imaging device, and/or may be distributed between a local ophthalmic imaging device and a remote service site.

Figure 4:
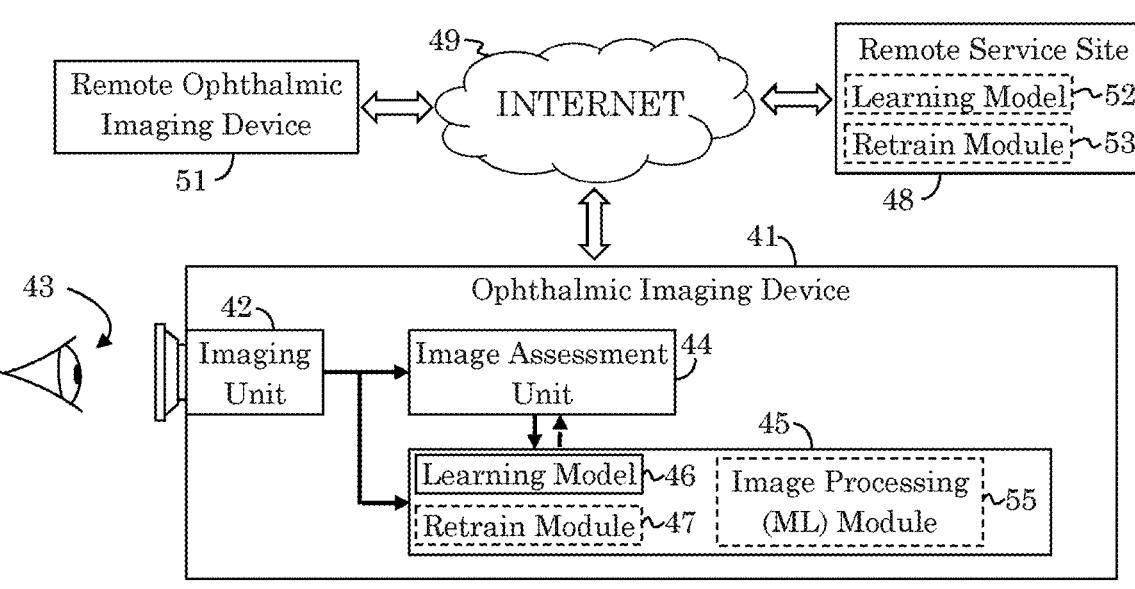
FIG. 4 illustrates an example of an ophthalmic imaging device implementing the present invention in the field or in a test setting to image an eye.

FIG. 4 illustrates an example of an ophthalmic imaging device 41 implementing the present invention to image an eye 43 (e.g., in the field or in a test setting). In the present example, ophthalmic imaging device 41 may use an image unit 42 to capture a sequence of images, which are passed to an image assessment unit (e.g. a motion tracking algorithm) 44. The captured images from the imaging unit may also be submitted as input images to a module 45 housing the present trained learning model 46 to classify/identify good images (AQ) and bad images (UQ), e.g., output of block 35 in FIG. 1. As discussed above, the Image Assessment Unit 44 may be configured to assess the sequence of images from the imaging unit 42, and determine a similarity measure between each sample image and one or more other images in the sequence of images, a confidence measure for each similarity measure, and optionally assign labels to the sample images. These metrics may be passed to module 45, which may use this information to update/retrain the learning model 46, as indicated by arrow 37 in FIG. 1. Learning model 46 may be retrained directly, or a stored version of the learning model may be retrained, as indicated by retrain module 47, and the retrained version of the learning model may then replace the existing learning model 46.

Optionally, the classification outputs from the learning model 46 may be used to update/retrain the learning model itself. For example, the learning model 46 designates a confidence measure to its assigned classification, and assessed images (from image assessment unit 44) that received a classification from the learning model with a designated confidence measures above a predefined threshold may be used as part of the new training set used to retrain the learning model 46. In one implementation, as indicated by block 33 in FIG. 1, the topmost confident predictions (e.g., hard negatives) are used for retraining. However, low confident classification examples, may also be used for training, as indicated by block 31. These low confidence The assessed images to which the learning model 46 assigned classifications with a confidence measure below a predefined threshold are flagged for manual inspection and selective reclassification based on the visual inspection. These manually inspected samples may then be used for retaining the learning model 46. Manual inspection may be done by a device operator at the local site where device 41 is located, such as upon request for manual inspection from device 41.

Alternatively, the manual inspection may be done remotely at a remote service site 48. For example, the labeled images from the learning model 46 (or a select sampling of these images) along with their confidence measure and/or similarity measures from the image assessment unit 44 may be sent through the cloud (e.g., the Internet or other computer network) 49 to the remote service site 48, which stores a remote-version of the learning model 52 and maintains its own retrain module 53 to retrain/update its stored remote-version of the learning model 52. In this manner, remote updating/retraining may be implemented in a manner similar to that described above for local retraining within ophthalmic imaging device 41. Multiple (e.g., remote) instances of the ophthalmic imaging device, as illustrated by remote device 51, may also interface with remote service site 48. I this manner, the remote-version of the learning model 52 may be updated/retrained using additional training sample pairs from multiple ophthalmic images devices. After the remote-version of the learning model 52 is updated/retrained, the retrained learning model may be sent via the cloud 49 to the multiple local devices 41/51 to update (e.g., replace) their local copies of the learning model.

Thus, the remote service site 48 may update/retrain the learning model as indicated by block 13 in FIG. 1, e.g., until a predefined confidence level for the learning model is reached, using the received, additional training samples/information (e.g., using the above-described method of generating training pairs). The updated/retrained learning model sent to the local ophthalmic imaging devices 41/51 and updated within the local device 41/51.

As mentioned above, the learning model 46 may be trained to identify (classify) input images (from imaging unit 42) that are suitable for further process. If the further processing is provided by the image assessment unit 44 (e.g., motion tracking), then the output from learning model 46 may be sent to the image assessment unit 44. In this manner, the learning model 46 may select which input images are suitable for motion tracking processing, and optionally select a reference image for use in a motion tracking operation. If the further processing is provided by another image processing module 55, then the output from the learning model may be sent to this other image processing module 55. Optionally, image processing module 55 may be a secondary learning model, or may be a secondary function/classification provided by the learning model 46.

Returning to FIG. 1, as mentioned above, in block 33, a predefined number of topmost highest confidence incorrect (and/or optionally correct) images output from the learning model (e.g., the top 100 highest confidence incorrect/correct image measures) may be included in the updated/new train set and the network may be retrained (arrow 37) using this expanded training set.

In the present example, the final network was run (e.g., tested/validated) on an independent holdout test set (e.g., sample images not used in training) of three subjects with various fixations. That is, the holdout test set is a validation set of labeled image samples used to verify the effectiveness of the present learning model. The outputs from the learning models are compared with the ground truth labels of the holdout test set to determine its accuracy.

Optionally, the training data may be updated with hard negatives (false positives and/or false negatives), which may correspond to low confidence labels, but the holdout set remains independent of the training set.

Figures 5A, 5B, 5C:
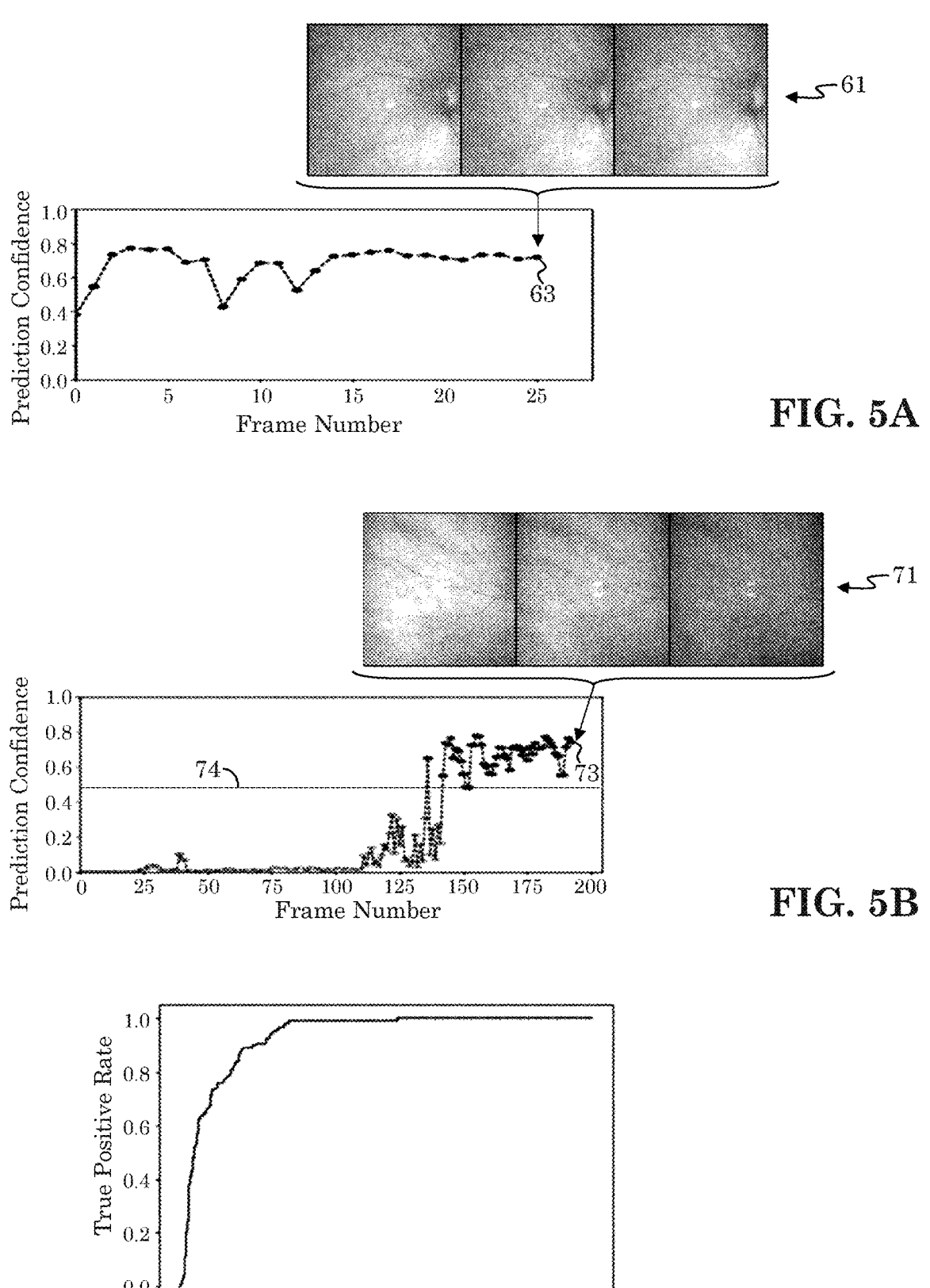
FIGS. 5a, 5b, and 5c show some performance results of an exemplary implementation of the present invention.

FIGS. 5a, 5b, and 5c show some performance results of an exemplary implementation of the present invention. FIG. 5a illustrates a chart of Prediction Confidence versus Frame Number for a sequence of images in a motion tracking system. The present example used three sequential images per input set (as illustrated in FIG. 3). An example of a 3-image input set 61 corresponding to the last data point 63 (e.g. the last input image set) in the chart is shown. As illustrated, the confidence of the classification varied initially (e.g., at the start of a motion tracking operation), but as the image capture sequence continued, the confidence eventually settled at about 80%. FIG. 5b shows another example of a Prediction Confidence versus Frame Number corresponding to the start of an image capture sequence. Again for illustration purposes, the last 3-image input set 71 corresponding to the last data point 73 is shown. In the present example, the initial images captured in the sequence were of low quality, but the quality stayed consistently above 50% (indicated by dotted line 74) after about frame number 145. The resulting performance was measured by visualizing the images as a video sequence along with the continuous confidence prediction curve, as is shown in FIG. 5c. The network has an Area under the Receiver Operating Characteristic (ROC) Curve (Area Under the Curve, AUC) of 0.91 on the hold out test set along with a 40 ms runtime on an Intel Core™ i7-9870H CPU.

The initial results of the proposed training method indicate that real time image quality assessment for IR image quality and has reasonable performance with the limited number of available datasets which enables usage in a real-world setting.

As mentioned above, the present invention may be used with other imaging modalities. For example, the present invention may be used in an OCT system to reduce the number of B-scans (e.g., facilities the selection of suitable B-scans) needed for training a learning model. In this case, the imaging unit 42 of FIG. 4 would be implemented as n OCT imaging system. A general discussion of OCT systems is provided below. Again, the image assessment unit 44 of FIG. 4 would examine a sequence of B-scan images captured by the OCT system and determine a similarity measure between a current B-scan image being assessed and the rest of the B-scans within a cube-scan.

Figure 6:
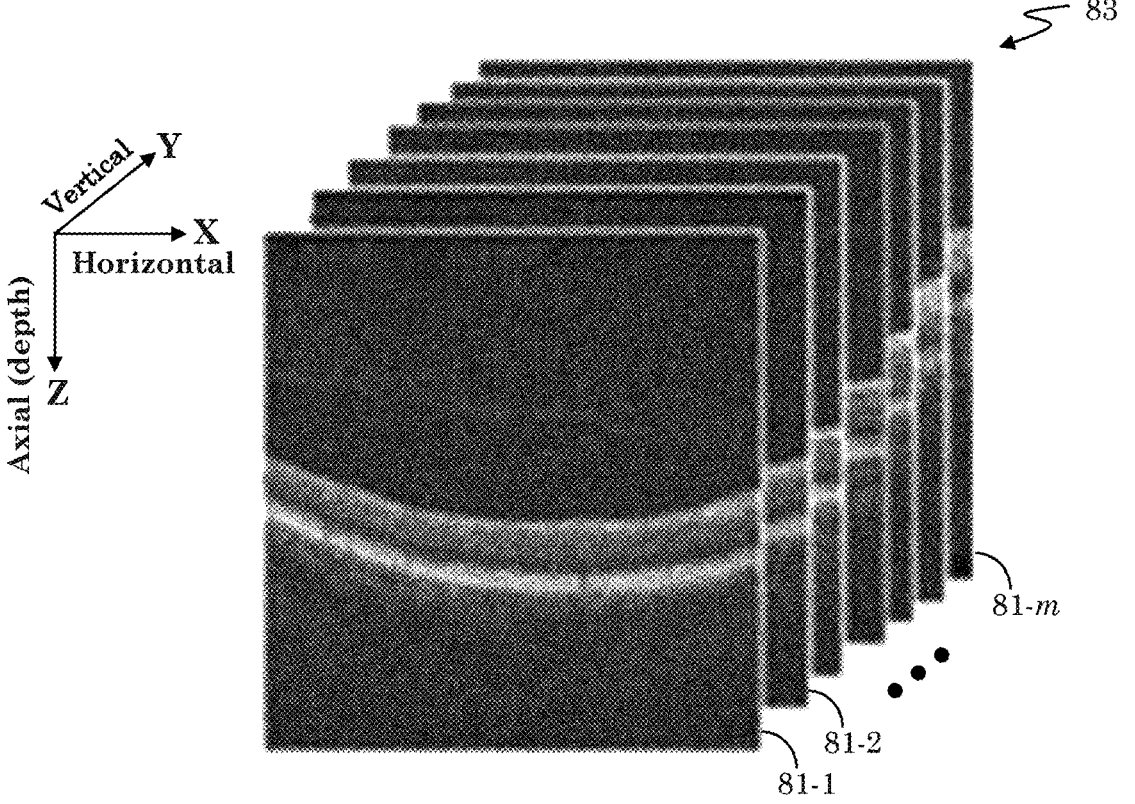
FIG. 6 illustrates the capturing of a sequence of B-scans 81-1 to 81-m, which together constitute a cube-scan (C-scan) 83.

For example, FIG. 6 illustrates the capturing of a sequence of B-scans 81-1 to 81-*m*, which together constitute a cube-scan (C-scan) 83. For illustration purposes, an axial axis Z, horizontal axis X, and vertical axis Y are identified. In a typical application, a B-scan is constructed by acquiring a series of axial scans (A-scans), where each A-scan provides depth information at one axial point. Multiple such A-scans are scanned in what is generally referred to as the fast scan direction (e.g., the horizontal X direction). The completion of one of these fast scans constitutes one B-scan 81-1. The OCT scanning system is then offset/moved vertically (along the Y axis) to start the next B-scan 81-2, and so on until the last B-scan 81-*m* is acquired and the C-scan 83 is complete. Consequently, the Y-axis scan direction is generally referred to as the slow scan direction.

In this implementation, the similarity scores provided by the image assessment unit 44 are used to select images (B-scans) for training the deep learning model for better utilization of annotation and computational resources. As discussed above, deep learning networks (DLN) have been shown to provide good performance for classification and segmentation tasks (e.g., tissue type identification and segmentation) in optical coherence tomography (OCT) imaging. Training a DLN requires large data, annotation, and computational resources. In an exemplary implementation of this approach, a couple of questions were explored: 1) Whether one can use selected B-scans from an OCT cube to train a learning model and get comparable performance to using all the B-scans in the OCT cube; and 2) Whether one can use image similarity metrics to select which B-scans (within the OCT cube) should be annotated for training purposes to maximize the performance of the trained learning model.

This exemplary implementation uses 76,544 B-scans from 512×128 macular cubes (cube-scans) of 598 subjects (patients) acquired using CIRRUS™ 5000 HD-OCT (ZEISS, Dublin, CA). B-scans from 478 and 120 OCT cubes are used for training and testing respectively. Each B-scan is annotated (e.g., labeled) for various retinal pathologies (disease type detection or classification or identification) by two retina specialists.

A baseline algorithm (e.g., BSOI-128) is trained using all 128 B-scans from all 478 OCT cubes. A ResNet-50 based DLN is retrained using randomly selected 96 (BSOI-R96), 64 and 32 B-scans from each cube. For each B-scan in an OCT cube, square differences (SqD), and cross correlation (CC) with other B-scans from the same OCT cube are calculated. SqD and cross correlation image similarity scores (SS) are computed by normalized summations. The ResNet-50 based DLN is retrained using 96 (75%), 64 (50%) and 32 (25%) of the B-scans selected with lowest SS from each OCT cube. Accuracy and time taken to train the DLN are measured. For completeness, carbon footprints are estimated using the ML CO2 impact calculator, known in the art.

The results of these test are shown in the table of FIG. 7. The table shows the different neural network architectures used (Model), the number of OCT cubes used (Cubes), the number of B-scans per cube, the total B-scans used, the resultant accuracy determined in a test/validation session, the training time needed to train each learning model (in minutes), the estimated carbon footprint, and the annotation times (in hours) based on the assumption that the average time to grade 128 B-scans in an OCT cube is 10 minutes.

The table shows the accuracy, training time using an Intel® Xeon® Processor E5-1650 v2 @3.50 GHz 48.0 GB RAM with NVIDIA GTX 1080 GPU for various models. Model trained using CC similarity score achieved higher accuracy than SqD and randomly selected B-scans.

The findings in this study suggest image SS can be used to select smaller number of images to annotate and train a DLN with low impact to performance when compared with the DLN trained with large data. This will reduce the computational and annotation time along with the benefit of reducing the GPU's carbon emission footprint.

Hereinafter is provided a description of various hardware and architectures suitable for the present invention.

Fundus Imaging System

Two categories of imaging systems used to image the fundus are flood illumination imaging systems (or flood illumination imagers) and scan illumination imaging systems (or scan imagers). Flood illumination imagers flood with light an entire field of view (FOV) of interest of a specimen at the same time, such as by use of a flash lamp, and capture a full-frame image of the specimen (e.g., the fundus) with a full-frame camera (e.g., a camera having a two-dimensional (2D) photo sensor array of sufficient size to capture the desired FOV, as a whole). For example, a flood illumination fundus imager would flood the fundus of an eye with light, and capture a full-frame image of the fundus in a single image capture sequence of the camera. A scan imager provides a scan beam that is scanned across a subject, e.g., an eye, and the scan beam is imaged at different scan positions as it is scanned across the subject creating a series of image-segments that may be reconstructed, e.g., montaged, to create a composite image of the desired FOV. The scan beam could be a point, a line, or a two-dimensional area such a slit or broad line. Examples of fundus imagers are provided in U.S. Pat. Nos. 8,967,806 and 8,998,411.

Figure 8:
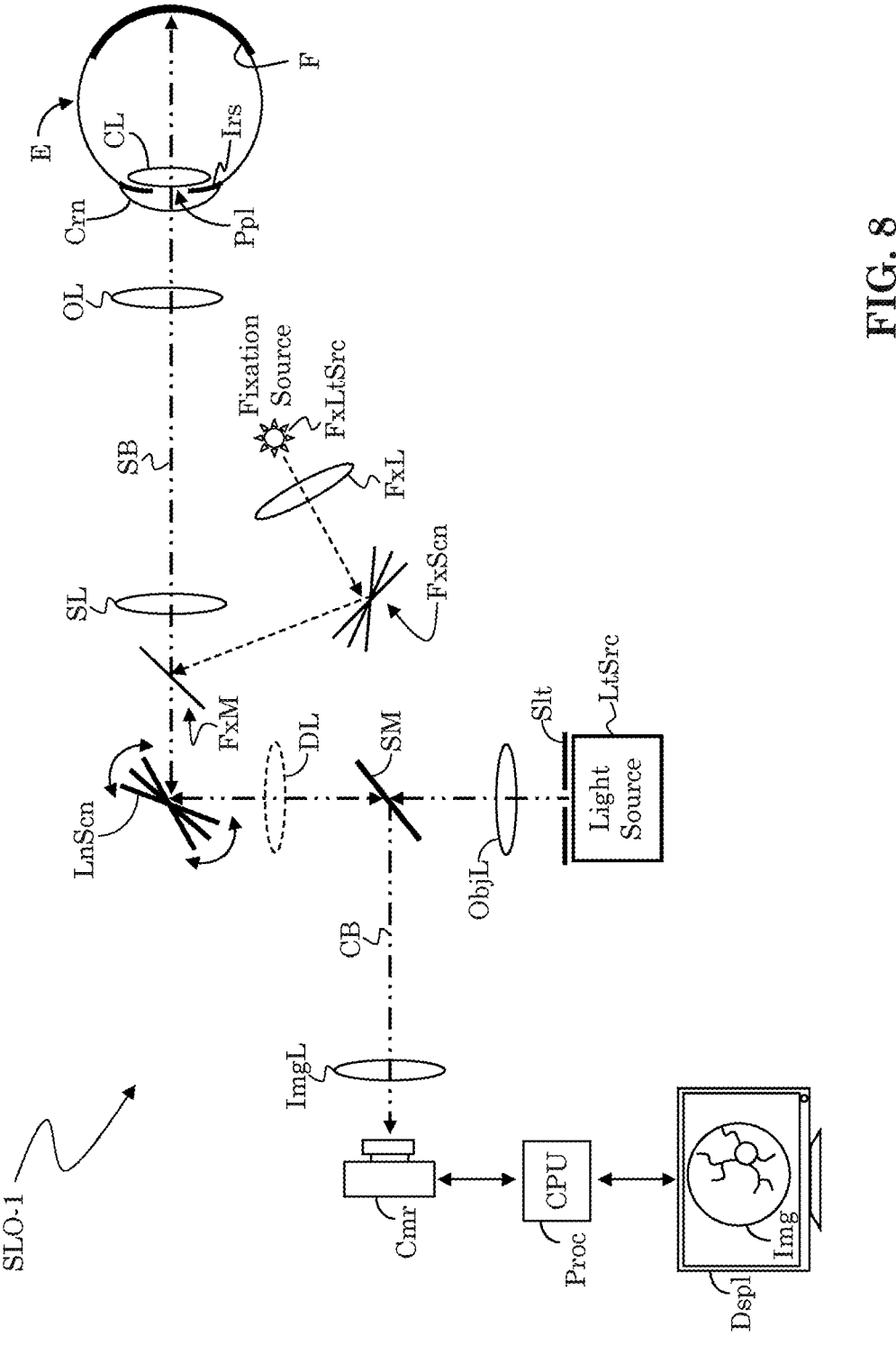
FIG. 8 illustrates an example of a slit scanning ophthalmic system for imaging a fundus.

FIG. 8 illustrates an example of a slit scanning ophthalmic system SLO-1 for imaging a fundus F, which is the interior surface of an eye E opposite the eye lens (or crystalline lens) CL and may include the retina, optic disc, macula, fovea, and posterior pole. In the present example, the imaging system is in a so-called "scan-descan" configuration, wherein a scanning line beam SB traverses the optical components of the eye E (including the cornea Crn, iris Irs, pupil Ppl, and crystalline lens CL) to be scanned across the fundus F. In the case of a flood fundus imager, no scanner is needed, and the light is applied across the entire, desired field of view (FOV) at once. Other scanning configurations are known in the art, and the specific scanning configuration is not critical to the present invention. As depicted, the imaging system includes one or more light sources LtSrc, preferably a multi-color LED system or a laser system in which the etendue has been suitably adjusted. An optional slit Slt (adjustable or static) is positioned in front of the light source LtSrc and may be used to adjust the width of the scanning line beam SB. Additionally, slit Slt may remain static during imaging or may be adjusted to different widths to allow for different confocality levels and different applications either for a particular scan or during the scan for use in suppressing reflexes. An optional objective lens ObjL may be placed in front of the slit Slt. The objective lens ObjL can be any one of state-of-the-art lenses including but not limited to refractive, diffractive, reflective, or hybrid lenses/ systems. The light from slit Slt passes through a pupil splitting mirror SM and is directed towards a scanner LnScn. It is desirable to bring the scanning plane and the pupil plane as near together as possible to reduce vignetting in the system. Optional optics DL may be included to manipulate the optical distance between the images of the two components. Pupil splitting mirror SM may pass an illumination beam from light source LtSrc to scanner LnScn, and reflect a detection beam from scanner LnScn (e.g., reflected light returning from eye E) toward a camera Cmr. A task of the pupil splitting mirror SM is to split the illumination and detection beams and to aid in the suppression of system reflexes. The scanner LnScn could be a rotating galvo scanner or other types of scanners (e.g., piezo or voice coil, micro-electromechanical system (MEMS) scanners, electro-optical deflectors, and/or rotating polygon scanners). Depending on whether the pupil splitting is done before or after the scanner LnScn, the scanning could be broken into two steps wherein one scanner is in an illumination path and a separate scanner is in a detection path. Specific pupil splitting arrangements are described in detail in U.S. Pat. No. 9,456,746, which is herein incorporated in its entirety by reference.

From the scanner LnScn, the illumination beam passes through one or more optics, in this case a scanning lens SL and an ophthalmic or ocular lens OL, that allow for the pupil of the eye E to be imaged to an image pupil of the system. Generally, the scan lens SL receives a scanning illumination beam from the scanner LnScn at any of multiple scan angles (incident angles), and produces scanning line beam SB with a substantially flat surface focal plane (e.g., a collimated light path). Ophthalmic lens OL may then focus the scanning line beam SB onto an object to be imaged. In the present example, ophthalmic lens OL focuses the scanning line beam SB onto the fundus F (or retina) of eye E to image the fundus. In this manner, scanning line beam SB creates a traversing scan line that travels across the fundus F. One possible configuration for these optics is a Kepler type telescope wherein the distance between the two lenses is selected to create an approximately telecentric intermediate fundus image (4-$f$ configuration). The ophthalmic lens OL could be a single lens, an achromatic lens, or an arrangement of different lenses. All lenses could be refractive, diffractive, reflective or hybrid as known to one skilled in the art. The focal length(s) of the ophthalmic lens OL, scan lens SL and the size and/or form of the pupil splitting mirror SM and scanner LnScn could be different depending on the desired field of view (FOV), and so an arrangement in which multiple components can be switched in and out of the beam path, for example by using a flip in optic, a motorized wheel, or a detachable optical element, depending on the field of view can be envisioned. Since the field of view change results in a different beam size on the pupil, the pupil splitting can also be changed in conjunction with the change to the FOV. For example, a 45° to 60° field of view is a typical, or standard, FOV for fundus cameras. Higher fields of view, e.g., a widefield FOV, of 60°-120°, or more, may also be feasible. A widefield FOV may be desired for a combination of the Broad-Line Fundus Imager (BLFI) with another imaging modalities such as optical coherence tomography (OCT). The upper limit for the field of view may be determined by the accessible working distance in combination with the physiological conditions around the human eye. Because a typical human retina has a FOV of 140° horizontal and 80°-100° vertical, it may be desirable to have an asymmetrical field of view for the highest possible FOV on the system.

The scanning line beam SB passes through the pupil Ppl of the eye E and is directed towards the retinal, or fundus, surface F. The scanner LnScn1 adjusts the location of the light on the retina, or fundus, F such that a range of transverse locations on the eye E are illuminated. Reflected or scattered light (or emitted light in the case of fluorescence imaging) is directed back along as similar path as the illumination to define a collection beam CB on a detection path to camera Cmr.

In the "scan-descan" configuration of the present, exemplary slit scanning ophthalmic system SLO-1, light returning from the eye E is "descanned" by scanner LnScn on its way to pupil splitting mirror SM. That is, scanner LnScn scans the illumination beam from pupil splitting mirror SM to define the scanning illumination beam SB across eye E, but since scanner LnScn also receives returning light from eye E at the same scan position, scanner LnScn has the effect of descanning the returning light (e.g., cancelling the scanning action) to define a non-scanning (e.g., steady or stationary) collection beam from scanner LnScn to pupil splitting mirror SM, which folds the collection beam toward camera Cmr. At the pupil splitting mirror SM, the reflected light (or emitted light in the case of fluorescence imaging) is separated from the illumination light onto the detection path directed towards camera Cmr, which may be a digital camera having a photo sensor to capture an image. An imaging (e.g., objective) lens ImgL may be positioned in the detection path to image the fundus to the camera Cmr. As is the case for objective lens ObjL, imaging lens ImgL may be any type of lens known in the art (e.g., refractive, diffractive, reflective or hybrid lens). Additional operational details, in particular, ways to reduce artifacts in images, are described in PCT Publication No. WO2016/124644, the contents of which are herein incorporated in their entirety by reference. The camera Cmr captures the received image, e.g., it creates an image file, which can be further processed by one or more (electronic) processors or computing devices (e.g., the computer system of FIG. 17). Thus, the collection beam (returning from all scan positions of the scanning line beam SB) is collected by the camera Cmr, and a full-frame image Img may be constructed from a composite of the individually captured collection beams, such as by montaging. However, other scanning configuration are also contemplated, including ones where the illumination beam is scanned across the eye E and the collection beam is scanned across a photo sensor array of the camera. PCT Publication WO 2012/059236 and US Patent Publication No. 2015/0131050, herein incorporated by reference, describe several embodiments of slit scanning ophthalmoscopes including various designs where the returning light is swept across the camera's photo sensor array and where the returning light is not swept across the camera's photo sensor array.

In the present example, the camera Cmr is connected to a processor (e.g., processing module) Proc and a display (e.g., displaying module, computer screen, electronic screen, etc.) Dspl, both of which can be part of the image system itself, or may be part of separate, dedicated processing and/or displaying unit(s), such as a computer system wherein data is passed from the camera Cmr to the computer system over a cable or computer network including wireless networks. The display and processor can be an all in one unit. The display can be a traditional electronic display/screen or of the touch screen type and can include a user interface for displaying information to and receiving information from an instrument operator, or user. The user can interact with the display using any type of user input device as known in the art including, but not limited to, mouse, knobs, buttons, pointer, and touch screen.

It may be desirable for a patient's gaze to remain fixed while imaging is carried out. One way to achieve this is to provide a fixation target that the patient can be directed to stare at. Fixation targets can be internal or external to the instrument depending on what area of the eye is to be imaged. One embodiment of an internal fixation target is shown in FIG. 8. In addition to the primary light source LtSrc used for imaging, a second optional light source FxLtSrc, such as one or more LEDs, can be positioned such that a light pattern is imaged to the retina using lens FxL, scanning element FxScn and reflector/mirror FxM. Fixation scanner FxScn can move the position of the light pattern and reflector FxM directs the light pattern from fixation scanner FxScn to the fundus F of eye E. Preferably, fixation scanner FxScn is position such that it is located at the pupil plane of the system so that the light pattern on the retina/fundus can be moved depending on the desired fixation location.

Slit-scanning ophthalmoscope systems are capable of operating in different imaging modes depending on the light source and wavelength selective filtering elements employed. True color reflectance imaging (imaging similar to that observed by the clinician when examining the eye using a hand-held or slit lamp ophthalmoscope) can be achieved when imaging the eye with a sequence of colored LEDs (red, blue, and green). Images of each color can be built up in steps with each LED turned on at each scanning position or each color image can be taken in its entirety separately. The three, color images can be combined to display the true color image, or they can be displayed individually to highlight different features of the retina. The red channel best highlights the choroid, the green channel highlights the retina, and the blue channel highlights the anterior retinal layers. Additionally, light at specific frequencies (e.g., individual colored LEDs or lasers) can be used to excite different fluorophores in the eye (e.g., autofluorescence) and the resulting fluorescence can be detected by filtering out the excitation wavelength.

The fundus imaging system can also provide an infrared reflectance image, such as by using an infrared laser (or other infrared light source). The infrared (IR) mode is advantageous in that the eye is not sensitive to the IR wavelengths. This may permit a user to continuously take images without disturbing the eye (e.g., in a preview/alignment mode) to aid the user during alignment of the instrument. Also, the IR wavelengths have increased penetration through tissue and may provide improved visualization of choroidal structures. In addition, fluorescein angiography (FA) and indocyanine green (ICG) angiography imaging can be accomplished by collecting images after a fluorescent dye has been injected into the subject's bloodstream. For example, in FA (and/or ICG) a series of time-lapse images may be captured after injecting a light-reactive dye (e.g., fluorescent dye) into a subject's bloodstream. It is noted that care must be taken since the fluorescent dye may lead to a life-threatening allergic reaction in a portion of the population. High contrast, greyscale images are captured using specific light frequencies selected to excite the dye. As the dye flows through the eye, various portions of the eye are made to glow brightly (e.g., fluoresce), making it possible to discern the progress of the dye, and hence the blood flow, through the eye.

Optical Coherence Tomography Imaging System

Generally, optical coherence tomography (OCT) uses low-coherence light to produce two-dimensional (2D) and three-dimensional (3D) internal views of biological tissue. OCT enables in vivo imaging of retinal structures. OCT angiography (OCTA) produces flow information, such as vascular flow from within the retina. Examples of OCT systems are provided in U.S. Pat. Nos. 6,741,359 and 9,706,915, and examples of an OCTA systems may be found in U.S. Pat. Nos. 9,700,206 and 9,759,544, all of which are herein incorporated in their entirety by reference. An exemplary OCT/OCTA system is provided herein.

FIG. 9 illustrates a generalized frequency domain optical coherence tomography (FD-OCT) system used to collect 3D image data of the eye suitable for use with the present invention. An FD-OCT system OCT_1 includes a light source, LtSrc1. Typical light sources include, but are not limited to, broadband light sources with short temporal coherence lengths or swept laser sources. A beam of light from light source LtSrc1 is routed, typically by optical fiber Fbr1, to illuminate a sample, e.g., eye E; a typical sample being tissues in the human eye. The light source LrSrc1 may, for example, be a broadband light source with short temporal coherence length in the case of spectral domain OCT (SD-OCT) or a wavelength tunable laser source in the case of swept source OCT (SS-OCT). The light may be scanned, typically with a scanner Scnr1 between the output of the optical fiber Fbr1 and the sample E, so that the beam of light (dashed line Bm) is scanned laterally over the region of the sample to be imaged. The light beam from scanner Scnr1 may pass through a scan lens SL and an ophthalmic lens OL and be focused onto the sample E being imaged. The scan lens SL may receive the beam of light from the scanner Scnr1 at multiple incident angles and produce substantially collimated light, and ophthalmic lens OL may then focus onto the sample. The present example illustrates a scan beam that needs to be scanned in two lateral directions (e.g., in x and y directions on a Cartesian plane) to scan a desired field of view (FOV). An example of this would be a point-field OCT, which uses a point-field beam to scan across a sample. Consequently, scanner Scnr1 is illustratively shown to include two sub-scanner: a first sub-scanner Xscn for scanning the point-field beam across the sample in a first direction (e.g., a horizontal x-direction); and a second sub-scanner Yscn for scanning the point-field beam on the sample in traversing second direction (e.g., a vertical y-direction). If the scan beam were a line-field beam (e.g., a line-field OCT), which may sample an entire line-portion of the sample at a time, then only one scanner may be needed to scan the line-field beam across the sample to span the desired FOV. If the scan beam were a full-field beam (e.g., a full-field OCT), no scanner may be needed, and the full-field light beam may be applied across the entire, desired FOV at once.

Figure 17:
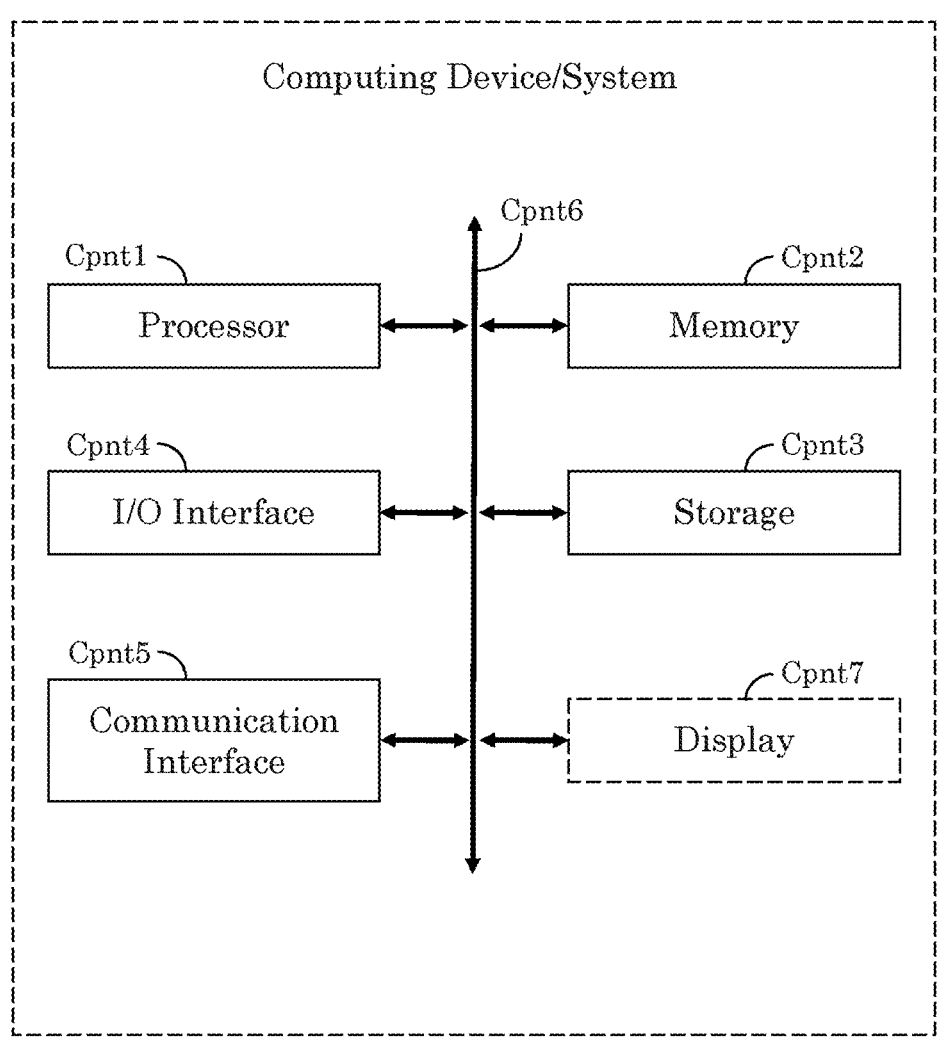
FIG. 17 illustrates an example computer system (or computing device or computer).

Irrespective of the type of beam used, light scattered from the sample (e.g., sample light) is collected. In the present example, scattered light returning from the sample is collected into the same optical fiber Fbr1 used to route the light for illumination. Reference light derived from the same light source LtSrc1 travels a separate path, in this case involving optical fiber Fbr2 and retro-reflector RR1 with an adjustable optical delay. Those skilled in the art will recognize that a transmissive reference path can also be used and that the adjustable delay could be placed in the sample or reference arm of the interferometer. Collected sample light is combined with reference light, for example, in a fiber coupler Cplr1, to form light interference in an OCT light detector Dtctr1 (e.g., photodetector array, digital camera, etc.). Although a single fiber port is shown going to the detector Dtctr1, those skilled in the art will recognize that various designs of interferometers can be used for balanced or unbalanced detection of the interference signal. The output from the detector Dtctr1 is supplied to a processor (e.g., internal or external computing device) Cmp1 that converts the observed interference into depth information of the sample. The depth information may be stored in a memory associated with the processor Cmp1 and/or displayed on a display (e.g., computer/electronic display/screen) Scn1. The processing and storing functions may be localized within the OCT instrument, or functions may be offloaded onto (e.g., performed on) an external processor (e.g., an external computing device), to which the collected data may be transferred. An example of a computing device (or computer system) is shown in FIG. 17. This unit could be dedicated to data processing or perform other tasks which are quite general and not dedicated to the OCT device. The processor (computing device) Cmp1 may include, for example, a field-programmable gate array (FPGA), a digital signal processor (DSP), an application specific integrated circuit (ASIC), a graphics processing unit (GPU), a system on chip (SoC), a central processing unit (CPU), a general purpose graphics processing unit (GPGPU), or a combination thereof, that may performs some, or the entire, processing steps in a serial and/or parallelized fashion with one or more host processors and/or one or more external computing devices.

The sample and reference arms in the interferometer could consist of bulk-optics, fiber-optics, or hybrid bulk-optic systems and could have different architectures such as Michelson, Mach-Zehnder or common-path based designs as would be known by those skilled in the art. Light beam as used herein should be interpreted as any carefully directed light path. Instead of mechanically scanning the beam, a field of light can illuminate a one or two-dimensional area of the retina to generate the OCT data (see for example, U.S. Pat. No. 9,332,902; D. Hillmann et al, "Holoscopy-Holographic Optical Coherence Tomography," *Optics Letters,* 36(13): 2390 2011; Y. Nakamura, et al, "High-Speed Three Dimensional Human Retinal Imaging by Line Field Spectral Domain Optical Coherence Tomography," *Optics Express,* 15(12):7103 2007; Blazkiewicz et al, "Signal-To-Noise Ratio Study of Full-Field Fourier-Domain Optical Coherence Tomography," *Applied Optics,* 44(36):7722 (2005)). In time-domain systems, the reference arm needs to have a tunable optical delay to generate interference. Balanced detection systems are typically used in TD-OCT and SS-OCT systems, while spectrometers are used at the detection port for SD-OCT systems. The invention described herein could be applied to any type of OCT system. Various aspects of the invention could apply to any type of OCT system or other types of ophthalmic diagnostic systems and/or multiple ophthalmic diagnostic systems including but not limited to fundus imaging systems, visual field test devices, and scanning laser polarimeters.

In Fourier Domain optical coherence tomography (FD-OCT), each measurement is the real-valued spectral interferogram (Sj(k)). The real-valued spectral data typically goes through several post-processing steps including background subtraction, dispersion correction, etc. The Fourier transform of the processed interferogram, results in a complex valued OCT signal output $Aj(z)=|Aj|e^{i\varphi}$. The absolute value of this complex OCT signal, $|Aj|$, reveals the profile of scattering intensities at different path lengths, and therefore scattering as a function of depth (z-direction) in the sample. Similarly, the phase, $\varphi j$ can also be extracted from the complex valued OCT signal. The profile of scattering as a function of depth is called an axial scan (A-scan). A set of A-scans measured at neighboring locations in the sample produces a cross-sectional image (tomogram or B-scan) of the sample. A collection of B-scans collected at different transverse locations on the sample makes up a data volume or cube. For a particular volume of data, the term fast axis refers to the scan direction along a single B-scan whereas slow axis refers to the axis along which multiple B-scans are collected. The term "cluster scan" may refer to a single unit or block of data generated by repeated acquisitions at the same (or substantially the same) location (or region) for the purposes of analyzing motion contrast, which may be used to identify blood flow. A cluster scan can consist of multiple A-scans or B-scans collected with relatively short time separations at approximately the same location(s) on the sample. Since the scans in a cluster scan are of the same region, static structures remain relatively unchanged from scan to scan within the cluster scan, whereas motion contrast between the scans that meets predefined criteria may be identified as blood flow.

A variety of ways to create B-scans are known in the art including but not limited to: along the horizontal or x-direction, along the vertical or y-direction, along the diagonal of x and y, or in a circular or spiral pattern. B-scans may be in the x-z dimensions but may be any cross-sectional image that includes the z-dimension. An example OCT B-scan image of a normal retina of a human eye is illustrated in FIG. 10. An OCT B-scan of the retinal provides a view of the structure of retinal tissue. For illustration purposes, FIG. 10 identifies various canonical retinal layers and layer boundaries. The identified retinal boundary layers include (from top to bottom): the inner limiting membrane (ILM) Lyer1, the retinal nerve fiber layer (RNFL or NFL) Layr2, the ganglion cell layer (GCL) Layr3, the inner plexiform layer (IPL) Layr4, the inner nuclear layer (INL) Layr5, the outer plexiform layer (OPL) Layr6, the outer nuclear layer (ONL) Layr7, the junction between the outer segments (OS) and inner segments (IS) (indicated by reference character Layr8) of the photoreceptors, the external or outer limiting membrane (ELM or OLM) Layr9, the retinal pigment epithelium (RPE) Layr10, and the Bruch's membrane (BM) Layr11.

In OCT Angiography, or Functional OCT, analysis algorithms may be applied to OCT data collected at the same, or approximately the same, sample locations on a sample at different times (e.g., a cluster scan) to analyze motion or flow (see for example US Patent Publication Nos. 2005/0171438, 2012/0307014, 2010/0027857, 2012/0277579 and U.S. Pat. No. 6,549,801, all of which are herein incorporated in their entirety by reference). An OCT system may use any one of a number of OCT angiography processing algorithms (e.g., motion contrast algorithms) to identify blood flow. For example, motion contrast algorithms can be applied to the intensity information derived from the image data (intensity-based algorithm), the phase information from the image data (phase-based algorithm), or the complex image data (complex-based algorithm). An enface image is a 2D projection of 3D OCT data (e.g., by averaging the intensity of each individual A-scan, such that each A-scan defines a pixel in the 2D projection). Similarly, an en face vasculature image is an image displaying motion contrast signal in which the data dimension corresponding to depth (e.g., z-direction along an A-scan) is displayed as a single representative value (e.g., a pixel in a 2D projection image), typically by summing or integrating all or an isolated portion of the data (see for example U.S. Pat. No. 7,301,644 herein incorporated in its entirety by reference). OCT systems that provide an angiography imaging functionality may be termed OCT angiography (OCTA) systems.

FIG. 11 shows an example of an enface vasculature image. After processing the data to highlight motion contrast using any of the motion contrast techniques known in the art, a range of pixels corresponding to a given tissue depth from the surface of internal limiting membrane (ILM) in retina, may be summed to generate the enface (e.g., frontal view) image of the vasculature. FIG. 12 shows an exemplary B-scan of a vasculature (OCTA) image. As illustrated, structural information may not be well-defined since blood flow may traverse multiple retinal layers making them less defined than in a structural OCT B-scan, as shown in FIG. 10. Nonetheless, OCTA provides a non-invasive technique for imaging the microvasculature of the retina and the choroid, which may be critical to diagnosing and/or monitoring various pathologies. For example, OCTA may be used to identify diabetic retinopathy by identifying microaneurysms, neovascular complexes, and quantifying foveal avascular zone and nonperfused areas. Moreover, OCTA has been shown to be in good agreement with fluorescein angiography (FA), a more traditional, but more evasive, technique requiring the injection of a dye to observe vascular flow in the retina. Additionally, in dry age-related macular degeneration, OCTA has been used to monitor a general decrease in choriocapillaris flow. Similarly in wet age-related macular degeneration, OCTA can provides a qualitative and quantitative analysis of choroidal neovascular membranes. OCTA has also been used to study vascular occlusions, e.g., evaluation of nonperfused areas and the integrity of superficial and deep plexus.

Neural Networks

As discussed above, the present invention may use a neural network (NN) machine learning (ML) model. For the sake of completeness, a general discussion of neural networks is provided herein. The present invention may use any, singularly or in combination, of the below described neural network architecture(s). A neural network, or neural net, is a (nodal) network of interconnected neurons, where each neuron represents a node in the network. Groups of neurons may be arranged in layers, with the outputs of one layer feeding forward to a next layer in a multilayer perceptron (MLP) arrangement. MLP may be understood to be a feedforward neural network model that maps a set of input data onto a set of output data.

Figure 13:
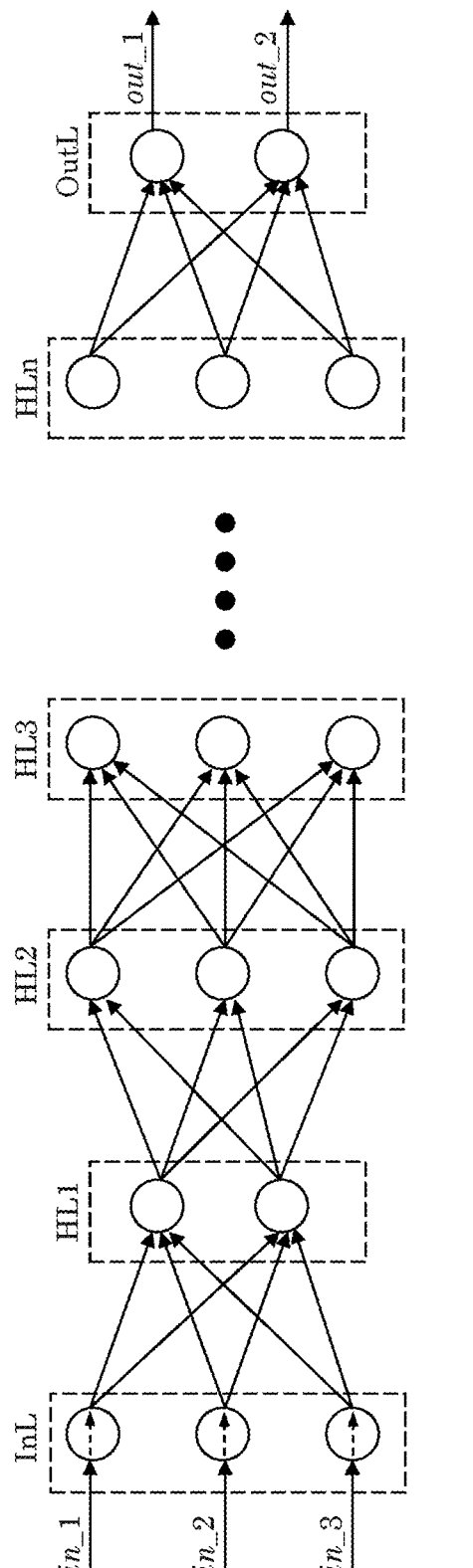
FIG. 13 illustrates an example of a multilayer perceptron (MLP) neural network.

FIG. 13 illustrates an example of a multilayer perceptron (MLP) neural network. Its structure may include multiple hidden (e.g., internal) layers HL1 to HLn that map an input layer InL (that receives a set of inputs (or vector input) in_1 to in_3) to an output layer OutL that produces a set of outputs (or vector output), e.g., out_1 and out_2. Each layer may have any given number of nodes, which are herein illustratively shown as circles within each layer. In the present example, the first hidden layer HL1 has two nodes, while hidden layers HL2, HL3, and HLn each have three nodes. Generally, the deeper the MLP (e.g., the greater the number of hidden layers in the MLP), the greater its capacity to learn. The input layer InL receives a vector input (illustratively shown as a three-dimensional vector consisting of in_1, in_2 and in_3), and may apply the received vector input to the first hidden layer HL1 in the sequence of hidden layers. An output layer OutL receives the output from the last hidden layer, e.g., HLn, in the multilayer model, processes its inputs, and produces a vector output result (illustratively shown as a two-dimensional vector consisting of out_1 and out_2).

Typically, each neuron (or node) produces a single output that is fed forward to neurons in the layer immediately following it. But each neuron in a hidden layer may receive multiple inputs, either from the input layer or from the outputs of neurons in an immediately preceding hidden layer. In general, each node may apply a function to its inputs to produce an output for that node. Nodes in hidden layers (e.g., learning layers) may apply the same function to their respective input(s) to produce their respective output(s). Some nodes, however, such as the nodes in the input layer InL receive only one input and may be passive, meaning that they simply relay the values of their single input to their output(s), e.g., they provide a copy of their input to their output(s), as illustratively shown by dotted arrows within the nodes of input layer InL.

Figure 14:
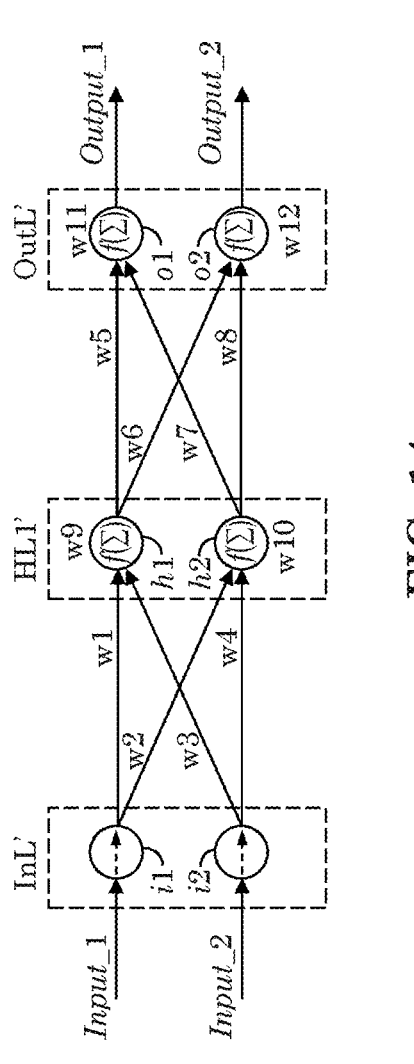
FIG. 14 shows a simplified neural network consisting of an input layer, a hidden layer, and an output layer.

For illustration purposes, FIG. 14 shows a simplified neural network consisting of an input layer InL', a hidden layer HL1', and an output layer OutL'. Input layer InL' is shown having two input nodes i1 and i2 that respectively receive inputs Input_1 and Input_2 (e.g. the input nodes of layer InL' receive an input vector of two dimensions). The input layer InL' feeds forward to one hidden layer HL1' having two nodes h1 and h2, which in turn feeds forward to an output layer OutL' of two nodes o1 and o2. Interconnections, or links, between neurons (illustrative shown as solid arrows) have weights w1 to w8. Typically, except for the input layer, a node (neuron) may receive as input the outputs of nodes in its immediately preceding layer. Each node may calculate its output by multiplying each of its inputs by each input's corresponding interconnection weight, summing the products of it inputs, adding (or multiplying by) a constant defined by another weight or bias that may be associated with that particular node (e.g., node weights w9, w10, w11, w12 respectively corresponding to nodes h1, h2, o1, and o2), and then applying a non-linear function or logarithmic function to the result. The non-linear function may be termed an activation function or transfer function. Multiple activation functions are known the art, and selection of a specific activation function is not critical to the present discussion. It is noted, however, that operation of the ML model, or behavior of the neural net, is dependent upon weight values, which may be learned so that the neural network provides a desired output for a given input.

The neural net learns (e.g., is trained to determine) appropriate weight values to achieve a desired output for a given input during a training, or learning, stage. Before the neural net is trained, each weight may be individually assigned an initial (e.g., random and optionally non-zero) value, e.g. a random-number seed. Various methods of assigning initial weights are known in the art. The weights are then trained (optimized) so that for a given training vector input, the neural network produces an output close to a desired (predetermined) training vector output. For example, the weights may be incrementally adjusted in thousands of iterative cycles by a technique termed back-propagation. In each cycle of back-propagation, a training input (e.g., vector input or training input image/sample) is fed forward through the neural network to determine its actual output (e.g., vector output). An error for each output neuron, or output node, is then calculated based on the actual neuron output and a target training output for that neuron (e.g., a training output image/sample corresponding to the present training input image/sample). One then propagates back through the neural network (in a direction from the output layer back to the input layer) updating the weights based on how much effect each weight has on the overall error so that the output of the neural network moves closer to the desired training output. This cycle is then repeated until the actual output of the neural network is within an acceptable error range of the desired training output for the given training input. As it would be understood, each training input may require many back-propagation iterations before achieving a desired error range. Typically, an epoch refers to one back-propagation iteration (e.g., one forward pass and one backward pass) of all the training samples, such that training a neural network may require many epochs. Generally, the larger the training set, the better the performance of the trained ML model, so various data augmentation methods may be used to increase the size of the training set. For example, when the training set includes pairs of corresponding training input images and training output images, the training images may be divided into multiple corresponding image segments (or patches). Corresponding patches from a training input image and training output image may be paired to define multiple training patch pairs from one input/output image pair, which enlarges the training set. Training on large training sets, however, places high demands on computing resources, e.g. memory and data processing resources. Computing demands may be reduced by dividing a large training set into multiple mini-batches, where the mini-batch size defines the number of training samples in one forward/backward pass. In this case, and one epoch may include multiple mini-batches. Another issue is the possibility of a NN overfitting a training set such that its capacity to generalize from a specific input to a different input is reduced. Issues of overfitting may be mitigated by creating an ensemble of neural networks or by randomly dropping out nodes within a neural network during training, which effectively removes the dropped nodes from the neural network. Various dropout regulation methods, such as inverse dropout, are known in the art.

It is noted that the operation of a trained NN machine model is not a straight-forward algorithm of operational/analyzing steps. Indeed, when a trained NN machine model receives an input, the input is not analyzed in the traditional sense. Rather, irrespective of the subject or nature of the input (e.g., a vector defining a live image/scan or a vector defining some other entity, such as a demographic description or a record of activity) the input will be subjected to the same predefined architectural construct of the trained neural network (e.g., the same nodal/layer arrangement, trained weight and bias values, predefined convolution/deconvolution operations, activation functions, pooling operations, etc.), and it may not be clear how the trained network's architectural construct produces its output. Furthermore, the values of the trained weights and biases are not deterministic and depend upon many factors, such as the amount of time the neural network is given for training (e.g., the number of epochs in training), the random starting values of the weights before training starts, the computer architecture of the machine on which the NN is trained, selection of training samples, distribution of the training samples among multiple mini-batches, choice of activation function(s), choice of error function(s) that modify the weights, and even if training is interrupted on one machine (e.g., having a first computer architecture) and completed on another machine (e.g., having a different computer architecture). The point is that the reasons why a trained ML model reaches certain outputs is not clear, and much research is currently ongoing to attempt to determine the factors on which a ML model bases its outputs. Therefore, the processing of a neural network on live data cannot be reduced to a simple algorithm of steps. Rather, its operation is dependent upon its training architecture, training sample sets, training sequence, and various circumstances in the training of the ML model.

In summary, construction of a NN machine learning model may include a learning (or training) stage and a classification (or operational) stage. In the learning stage, the neural network may be trained for a specific purpose and may be provided with a set of training examples, including training (sample) inputs and training (sample) outputs, and optionally including a set of validation examples to test the progress of the training. During this learning process, various weights associated with nodes and node-interconnections in the neural network are incrementally adjusted in order to reduce an error between an actual output of the neural network and the desired training output. In this manner, a multi-layer feedforward neural network (such as discussed above) may be made capable of approximating any measurable function to any desired degree of accuracy. The result of the learning stage is a (neural network) machine learning (ML) model that has been learned (e.g., trained). In the operational stage, a set of test inputs (or live inputs) may be submitted to the learned (trained) ML model, which may apply what it has learned to produce an output prediction based on the test inputs.

Like the regular neural networks of FIGS. 13 and 14, convolutional neural networks (CNN) are also made up of neurons that have learnable weights and biases. Each neuron receives inputs, performs an operation (e.g., dot product), and is optionally followed by a non-linearity. The CNN, however, may receive raw image pixels at one end (e.g., the input end) and provide classification (or class) scores at the other end (e.g., the output end). Because CNNs expect an image as input, they are optimized for working with volumes (e.g., pixel height and width of an image, plus the depth of the image, e.g., color depth such as an RGB depth defined of three colors: red, green, and blue). For example, the layers of a CNN may be optimized for neurons arranged in 3 dimensions. The neurons in a CNN layer may also be connected to a small region of the layer before it, instead of all of the neurons in a fully-connected NN. The final output layer of a CNN may reduce a full image into a single vector (classification) arranged along the depth dimension.

Figure 15:
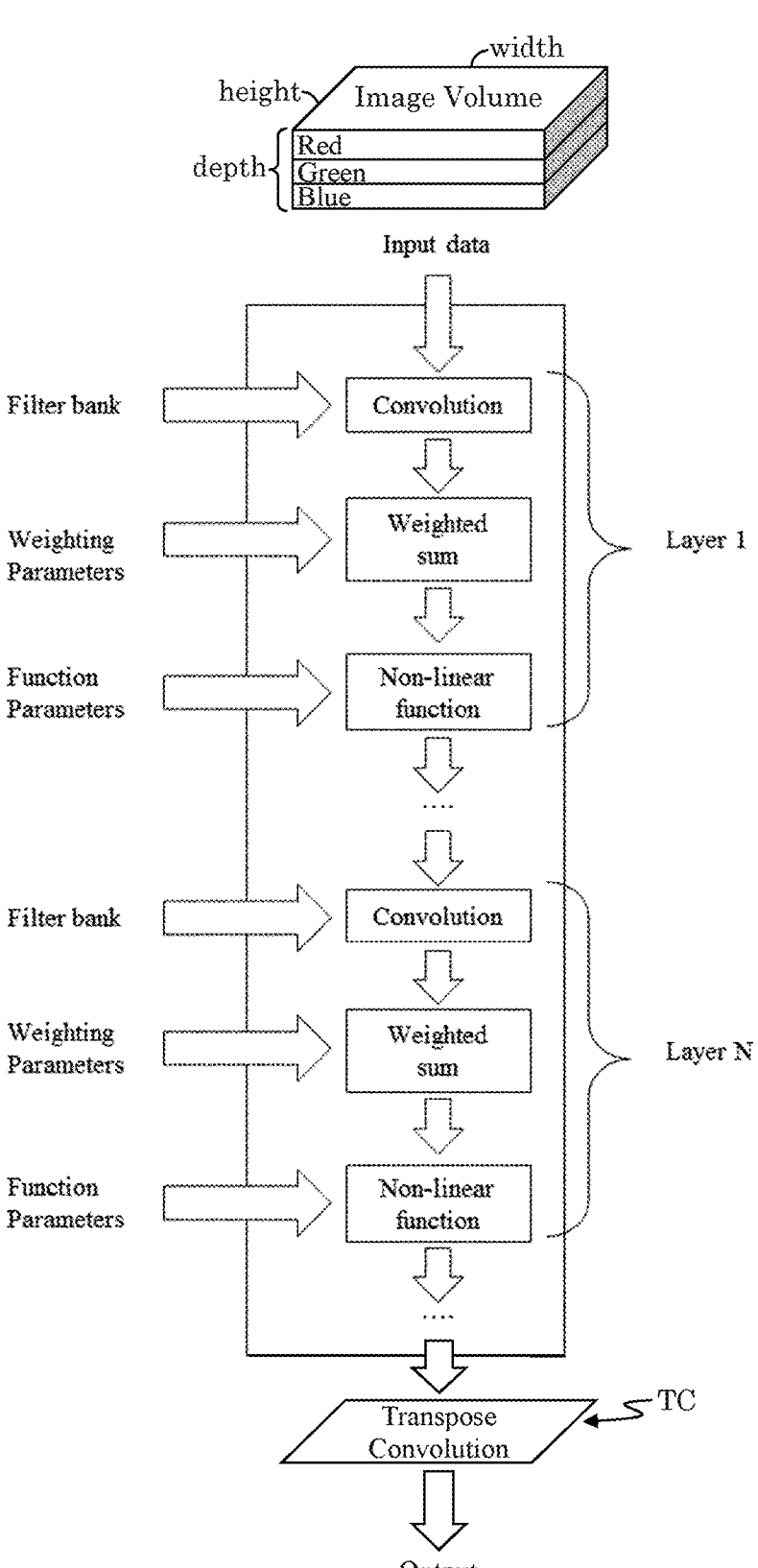
FIG. 15 illustrates an example convolutional neural network architecture.

FIG. 15 provides an example convolutional neural network architecture. A convolutional neural network may be defined as a sequence of two or more layers (e.g., Layer 1 to Layer N), where a layer may include a (image) convolution step, a weighted sum (of results) step, and a non-linear function step. The convolution may be performed on its input data by applying a filter (or kernel), e.g. on a moving window across the input data, to produce a feature map. Each layer and component of a layer may have different pre-determined filters (from a filter bank), weights (or weighting parameters), and/or function parameters. In the present example, the input data is an image, which may be raw pixel values of the image, of a given pixel height and width. In the present example, the input image is illustrated as having a depth of three color channels RGB (Red, Green, and Blue). Optionally, the input image may undergo various preprocessing, and the preprocessing results may be input in place of, or in addition to, the raw input image. Some examples of image preprocessing may include: retina blood vessel map segmentation, color space conversion, adaptive histogram equalization, connected components generation, etc. Within a layer, a dot product may be computed between the given weights and a small region they are connected to in the input volume. Many ways of configuring a CNN are known in the art, but as an example, a layer may be configured to apply an elementwise activation function, such as max (0,x) thresholding at zero. A pooling function may be performed (e.g., along the x-y directions) to down-sample a volume. A fully-connected layer may be used to determine the classification output and produce a one-dimensional output vector, which has been found useful for image recognition and classification. However, for image segmentation, the CNN would need to classify each pixel. Since each CNN layers tends to reduce the resolution of the input image, another stage is needed to up-sample the image back to its original resolution. This may be achieved by application of a transpose convolution (or deconvolution) stage TC, which typically does not use any predefine interpolation method, and instead has learnable parameters.

Convolutional Neural Networks have been successfully applied to many computer vision problems. As explained above, training a CNN generally requires a large training dataset. The U-Net architecture is based on CNNs and can generally be trained on a smaller training dataset than conventional CNNs.

Figure 16:
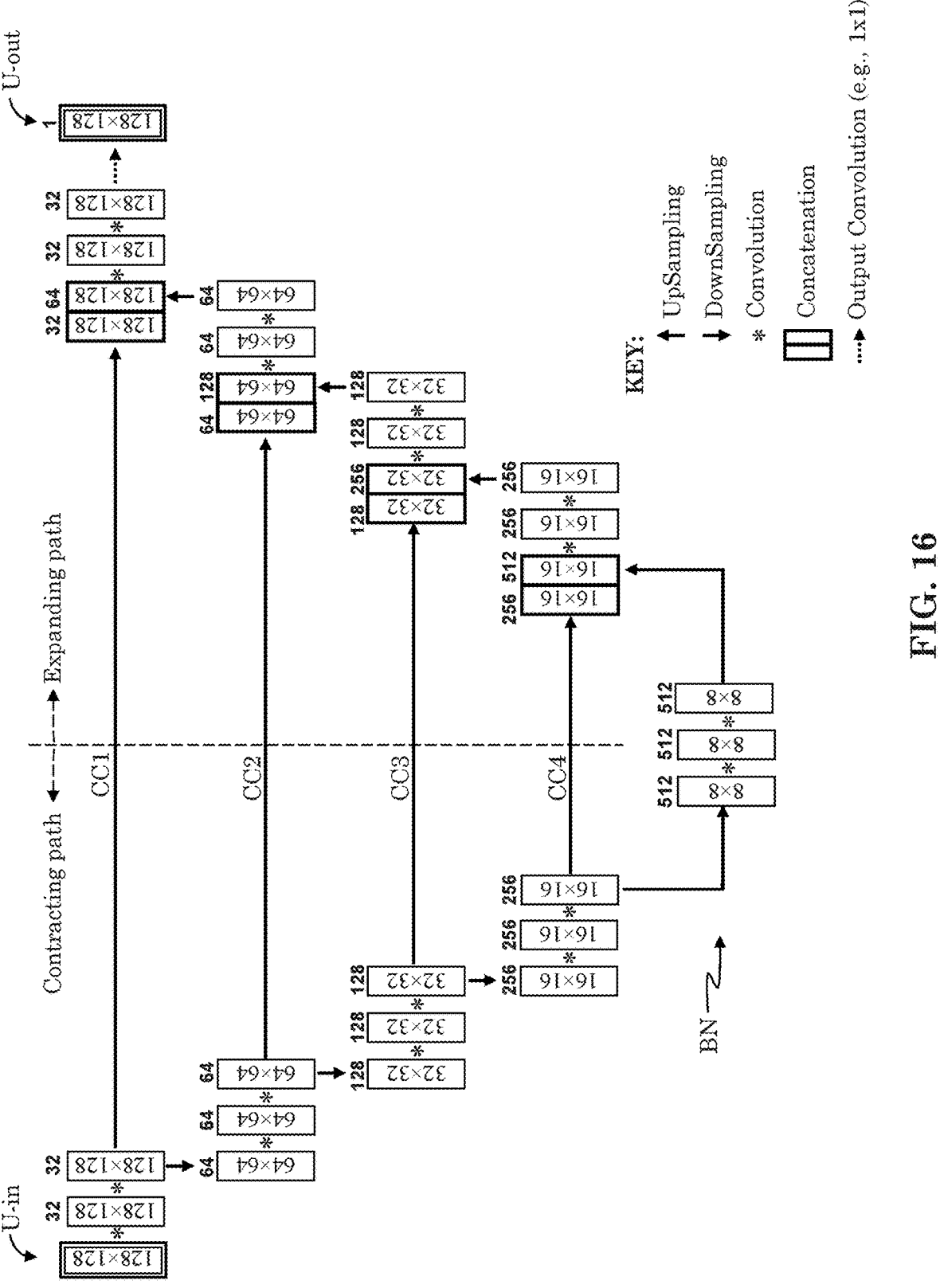
FIG. 16 illustrates an example U-Net architecture.

FIG. 16 illustrates an example U-Net architecture. The present exemplary U-Net includes an input module (or input layer or stage) that receives an input U-in (e.g., input image or image patch) of any given size. For illustration purposes, the image size at any stage, or layer, is indicated within a box that represents the image, e.g., the input module encloses number "128×128" to indicate that input image U-in is comprised of 128 by 128 pixels. The input image may be a fundus image, an OCT/OCTA enface, B-scan image, etc. It is to be understood, however, that the input may be of any size or dimension. For example, the input image may be an RGB color image, monochrome image, volume image, etc. The input image undergoes a series of processing layers, each of which is illustrated with exemplary sizes, but these sizes are illustration purposes only and would depend, for example, upon the size of the image, convolution filter, and/or pooling stages. The present architecture consists of a contracting path (herein illustratively comprised of four encoding modules) followed by an expanding path (herein illustratively comprised of four decoding modules), and copy-and-crop links (e.g., CC1 to CC4) between corresponding modules/stages that copy the output of one encoding module in the contracting path and concatenates it to (e.g., appends it to the back of) the up-converted input of a correspond decoding module in the expanding path. This results in a characteristic U-shape, from which the architecture draws its name. Optionally, such as for computational considerations, a "bottleneck" module/stage (BN) may be positioned between the contracting path and the expanding path. The bottleneck BN may consist of two convolutional layers (with batch normalization and optional dropout).

The contracting path is similar to an encoder, and generally captures context (or feature) information by the use of feature maps. In the present example, each encoding module in the contracting path may include two or more convolutional layers, illustratively indicated by an asterisk symbol "*", and which may be followed by a max pooling layer (e.g., DownSampling layer). For example, input image U-in is illustratively shown to undergo two convolution layers, each with 32 feature maps. As it would be understood, each convolution kernel produces a feature map (e.g., the output from a convolution operation with a given kernel is an image typically termed a "feature map"). For example, input U-in undergoes a first convolution that applies 32 convolution kernels (not shown) to produce an output consisting of 32 respective feature maps. However, as it is known in the art, the number of feature maps produced by a convolution operation may be adjusted (up or down). For example, the number of feature maps may be reduced by averaging groups of feature maps, dropping some feature maps, or other known method of feature map reduction. In the present example, this first convolution is followed by a second convolution whose output is limited to 32 feature maps. Another way to envision feature maps may be to think of the output of a convolution layer as a 3D image whose 2D dimension is given by the listed X-Y planar pixel dimension (e.g., 128×128 pixels), and whose depth is given by the number of feature maps (e.g., 32 planar images deep). Following this analogy, the output of the second convolution (e.g., the output of the first encoding module in the contracting path) may be described as a 128×128×32 image. The output from the second convolution then undergoes a pooling operation, which reduces the 2D dimension of each feature map (e.g., the X and Y dimensions may each be reduced by half). The pooling operation may be embodied within the DownSampling operation, as indicated by a downward arrow. Several pooling methods, such as max pooling, are known in the art and the specific pooling method is not critical to the present invention. The number of feature maps may double at each pooling, starting with 32 feature maps in the first encoding module (or block), 64 in the second encoding module, and so on. The contracting path thus forms a convolutional network consisting of multiple encoding modules (or stages or blocks). As is typical of convolutional networks, each encoding module may provide at least one convolution stage followed by an activation function (e.g., a rectified linear unit (ReLU) or sigmoid layer), not shown, and a max pooling operation. Generally, an activation function introduces non-linearity into a layer (e.g., to help avoid overfitting issues), receives the results of a layer, and determines whether to "activate" the output (e.g., determines whether the value of a given node meets predefined criteria to have an output forwarded to a next layer/node). In summary, the contracting path generally reduces spatial information while increasing feature information.

The expanding path is similar to a decoder, and among other things, may provide localization and spatial information for the results of the contracting path, despite the down sampling and any max-pooling performed in the contracting stage. The expanding path includes multiple decoding modules, where each decoding module concatenates its current up-converted input with the output of a corresponding encoding module. In this manner, feature and spatial information are combined in the expanding path through a sequence of up-convolutions (e.g., UpSampling or transpose convolutions or deconvolutions) and concatenations with high-resolution features from the contracting path (e.g., via CC1 to CC4). Thus, the output of a deconvolution layer is concatenated with the corresponding (optionally cropped) feature map from the contracting path, followed by two convolutional layers and activation function (with optional batch normalization).

The output from the last expanding module in the expanding path may be fed to another processing/training block or layer, such as a classifier block, that may be trained along with the U-Net architecture. Alternatively, or in addition, the output of the last upsampling block (at the end of the expanding path) may be submitted to another convolution (e.g., an output convolution) operation, as indicated by a dotted arrow, before producing its output U-out. The kernel size of output convolution may be selected to reduce the dimensions of the last upsampling block to a desired size. For example, the neural network may have multiple features per pixels right before reaching the output convolution, which may provide a 1×1 convolution operation to combine these multiple features into a single output value per pixel, on a pixel-by-pixel level.

Computing Device/System

FIG. 17 illustrates an example computer system (or computing device or computer device). In some embodiments, one or more computer systems may provide the functionality described or illustrated herein and/or perform one or more steps of one or more methods described or illustrated herein. The computer system may take any suitable physical form. For example, the computer system may be an embedded computer system, a system-on-chip (SOC), a single-board computer system (SBC) (such as, for example, a computer-on-module (COM) or system-on-module (SOM)), a desktop computer system, a laptop or notebook computer system, a mesh of computer systems, a mobile telephone, a personal digital assistant (PDA), a server, a tablet computer system, an augmented/virtual reality device, or a combination of two or more of these. Where appropriate, the computer system may reside in a cloud, which may include one or more cloud components in one or more networks.

In some embodiments, the computer system may include a processor Cpnt1, memory Cpnt2, storage Cpnt3, an input/output (I/O) interface Cpnt4, a communication interface Cpnt5, and a bus Cpnt6. The computer system may optionally also include a display Cpnt7, such as a computer monitor or screen.

Processor Cpnt1 includes hardware for executing instructions, such as those making up a computer program. For example, processor Cpnt1 may be a central processing unit (CPU) or a general-purpose computing on graphics processing unit (GPGPU). Processor Cpnt1 may retrieve (or fetch) the instructions from an internal register, an internal cache, memory Cpnt2, or storage Cpnt3, decode and execute the instructions, and write one or more results to an internal register, an internal cache, memory Cpnt2, or storage Cpnt3. In particular embodiments, processor Cpnt1 may include one or more internal caches for data, instructions, or addresses. Processor Cpnt1 may include one or more instruction caches, one or more data caches, such as to hold data tables. Instructions in the instruction caches may be copies of instructions in memory Cpnt2 or storage Cpnt3, and the instruction caches may speed up retrieval of those instructions by processor Cpnt1. Processor Cpnt1 may include any suitable number of internal registers, and may include one or more arithmetic logic units (ALUs). Processor Cpnt1 may be a multi-core processor; or include one or more processors Cpnt1. Although this disclosure describes and illustrates a particular processor, this disclosure contemplates any suitable processor.

Memory Cpnt2 may include main memory for storing instructions for processor Cpnt1 to execute or to hold interim data during processing. For example, the computer system may load instructions or data (e.g., data tables) from storage Cpnt3 or from another source (such as another computer system) to memory Cpnt2. Processor Cpnt1 may load the instructions and data from memory Cpnt2 to one or more internal register or internal cache. To execute the instructions, processor Cpnt1 may retrieve and decode the instructions from the internal register or internal cache. During or after execution of the instructions, processor Cpnt1 may write one or more results (which may be intermediate or final results) to the internal register, internal cache, memory Cpnt2 or storage Cpnt3. Bus Cpnt6 may include one or more memory buses (which may each include an address bus and a data bus) and may couple processor Cpnt1 to memory Cpnt2 and/or storage Cpnt3. Optionally, one or more memory management unit (MMU) facilitate data transfers between processor Cpnt1 and memory Cpnt2. Memory Cpnt2 (which may be fast, volatile memory) may include random access memory (RAM), such as dynamic RAM (DRAM) or static RAM (SRAM). Storage Cpnt3 may include long-term or mass storage for data or instructions. Storage Cpnt3 may be internal or external to the computer system, and include one or more of a disk drive (e.g., hard-disk drive, HDD, or solid-state drive, SSD), flash memory, ROM, EPROM, optical disc, magneto-optical disc, magnetic tape, Universal Serial Bus (USB)-accessible drive, or other type of non-volatile memory.

I/O interface Cpnt4 may be software, hardware, or a combination of both, and include one or more interfaces (e.g., serial or parallel communication ports) for communication with I/O devices, which may enable communication with a person (e.g., user). For example, I/O devices may include a keyboard, keypad, microphone, monitor, mouse, printer, scanner, speaker, still camera, stylus, tablet, touch screen, trackball, video camera, another suitable I/O device, or a combination of two or more of these.

Communication interface Cpnt5 may provide network interfaces for communication with other systems or networks. Communication interface Cpnt5 may include a Bluetooth interface or other type of packet-based communication. For example, communication interface Cpnt5 may include a network interface controller (NIC) and/or a wireless NIC or a wireless adapter for communicating with a wireless network.

Communication interface Cpnt5 may provide communication with a WI-FI network, an ad hoc network, a personal area network (PAN), a wireless PAN (e.g., a Bluetooth WPAN), a local area network (LAN), a wide area network (WAN), a metropolitan area network (MAN), a cellular telephone network (such as, for example, a Global System for Mobile Communications (GSM) network), the Internet, or a combination of two or more of these.

Bus Cpnt6 may provide a communication link between the above-mentioned components of the computing system. For example, bus Cpnt6 may include an Accelerated Graphics Port (AGP) or other graphics bus, an Enhanced Industry Standard Architecture (EISA) bus, a front-side bus (FSB), a HyperTransport (HT) interconnect, an Industry Standard Architecture (ISA) bus, an InfiniBand bus, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or other suitable bus or a combination of two or more of these.

Although this disclosure describes and illustrates a particular computer system having a particular number of particular components in a particular arrangement, this disclosure contemplates any suitable computer system having any suitable number of any suitable components in any suitable arrangement.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

The invention claimed is:

1. An ophthalmic imaging device, comprising:
an imaging unit for capturing a sequence of images of a patient's eye;
an image assessment unit configured to, for one or more sample images selected from among the sequence of images, determine a similarity measure between each sample image and one or more other images in the sequence of images; and
a learning model trained to assign a classification to an input image;
wherein the learning model is retrained using a selection of the assessed sample images based on their respective similarity measure,
wherein the imaging unit is an optical coherence tomography (OCT) unit,
wherein the sequence of images is a sequence of B-scans comprising a cube-scan, and
wherein the assessed sample images that are used to retrain the learning model are a fraction of the B-scans that are selected for being the most dissimilar to the rest of the B-scans in the cube-scan, as determined by their respective similarity measures.

2. The ophthalmic imaging device of claim 1, wherein the learning model is updated by retraining a stored version of the learning model, and the retrained version of the learning model replaces the existing learning model.

3. The ophthalmic imaging device of claim 2, wherein the stored version of the learning model is stored and retrained within the ophthalmic imaging device.

4. The ophthalmic imaging device of claim 2, wherein:
the ophthalmic imaging device includes a communication system for transmitting assessed images to a remote service site; and
the stored version of the learning model is stored and retrained at the remote service site and the retrained version of the learning model is transmitted from the remote service site to the ophthalmic imaging device to replace the existing learning model at the ophthalmic imaging device.

5. The ophthalmic imaging device of claim 1, wherein the learning model designates a confidence measure to an assigned classification of the learning model, and assessed images whose classifications have designated confidence measures above a predefined threshold are used to retrain the learning model.

6. The ophthalmic imaging device of claim 1, wherein:
the learning model determines a confidence measure for each image assigned classification;
assessed images whose assigned classifications have a confidence measure below a predefined threshold are flagged for manual inspection and selective reclassification based on the visual inspection; and
the learning model is retrained using the reclassified images.

7. The ophthalmic imaging device of claim 1, wherein the learning model is trained to assign a first classification indicating that an input image is suitable for further processing and a second classification indicating that the input image is not suitable for further processing.

8. The ophthalmic imaging device of claim 1, wherein:
a select image within the sequence of images is designated a reference image;
the similarity measure is based on the similarity between each sample image and the reference image; and
selection of the reference image is based on the output of the learning model.

9. The ophthalmic imaging device of claim 7, wherein images assigned the first classification are submitted to an image processing module configured to identify a tissue type within the input image and input images assigned the second classification are not submitted to the image processing module.

10. The ophthalmic imaging device of claim 9, wherein the image processing module is a secondary machine learning module within the ophthalmic imaging device.

11. The ophthalmic imaging device of claim 1, wherein for each B-scan being assessed, the similarity measure is based on the square differences (SqD) or the cross correlation (CC) of the B-scan being assessed and the other B-scans in the cube-scan.

12. The ophthalmic imaging device of claim 1, wherein the imaging unit is an imaging system for an anterior segment imaging of the eye, an imaging system for posterior segment imaging of the eye, an optical coherence tomography (OCT) system, or an OCT angiography (OCTA) system.

13. The ophthalmic imaging device of claim 1, wherein the learning model is based on a Visual Geometry Group (VGG), Residual Neural Network (ResNet), EfficientNet-B0, convolutional neural network, U-net, or deep learning neural network.

14. The ophthalmic imaging device of claim 1, wherein:
the sequence of images is divided into a plurality of image groups;
a select image within each image group is designated a reference image; and
the similarity measure is based on the similarity between the sample image and the reference image of the image group to which the sample image belongs.

15. The ophthalmic imaging device of claim 14, wherein the images within each image group are ordered based on the original sequence of the images within the sequence of images.

16. The ophthalmic imaging device of claim 1, wherein the learning model is configured to receive a plurality of input images as an input group, and assign the classification to at least one image within the input group.

17. The ophthalmic imaging device of claim 1, wherein the assigned classification is an indicator of motion tracking, image quality assessment (IQA), fluid flow, tissue structure, and decease disease type.

18. An ophthalmic imaging device, comprising:
an imaging unit for capturing a sequence of images of a patient's eye;
an image assessment unit configured to, for one or more sample images selected from among the sequence of images, determine a similarity measure between each sample image and one or more other images in the sequence of images;
a learning model trained to assign a classification to an input image, wherein the learning model is retrained using a selection of the assessed sample images based on their respective similarity measure, and wherein the learning model is trained to assign a first classification indicating that an input image is suitable for further processing and a second classification indicating that an input image is not suitable for further processing;

wherein the image assessment unit is a motion tracking system, wherein the similarity measure is based on motion tracking parameters determined by the motion tracking system, wherein the assessed sample images are assigned the first classification label based on the assessed sample images respective similarity measure, and wherein the learning model is retrained using the assessed sample images that received the first classification from the image assessment unit.

19. The ophthalmic imaging device of claim 18, wherein the further processing is motion tracking, and the output of the learning model is sent to the image assessment unit for processing.

* * * * *